(12) United States Patent
Kim

(10) Patent No.: US 11,163,330 B2
(45) Date of Patent: Nov. 2, 2021

(54) DISPLAY DEVICE INCLUDING CUSHION LAYER

(71) Applicant: SAMSUNG DISPLAY CO., LTD., Yongin-si (KR)

(72) Inventor: Sebong Kim, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/448,601

(22) Filed: Jun. 21, 2019

(65) Prior Publication Data

US 2020/0089274 A1    Mar. 19, 2020

(30) Foreign Application Priority Data

Sep. 14, 2018  (KR) .................. 10-2018-0109922

(51) Int. Cl.
*G06F 1/16*          (2006.01)

(52) U.S. Cl.
CPC .......... *G06F 1/1618* (2013.01); *G06F 1/1652* (2013.01)

(58) Field of Classification Search
CPC .... G06F 1/1652; G06F 1/1641; G06F 1/1618; H04M 1/0268
See application file for complete search history.

(56) References Cited

U.S. PATENT DOCUMENTS

| 9,280,176 | B2 | 3/2016 | Chong et al. |
| 10,303,218 | B2* | 5/2019 | Jones ................... G06F 1/1618 |
| 2016/0048171 | A1* | 2/2016 | Lee ........................ G06F 1/1641 361/679.27 |
| 2016/0303843 | A1* | 10/2016 | Jang ................... B32B 37/0084 |
| 2017/0229665 | A1* | 8/2017 | Park .................... H01L 51/5253 |
| 2018/0102496 | A1 | 4/2018 | Kim et al. |
| 2018/0134007 | A1* | 5/2018 | Lee ........................ G06F 1/1641 |
| 2018/0166652 | A1 | 6/2018 | Kim et al. |

FOREIGN PATENT DOCUMENTS

| KR | 1020150081931 | 7/2015 |
| KR | 1020180055973 | 5/2018 |
| KR | 1020180066378 | 6/2018 |

* cited by examiner

*Primary Examiner* — James Wu
(74) *Attorney, Agent, or Firm* — F. Chau & Associates, LLC

(57) ABSTRACT

A display device includes a window, a display panel disposed below the window, and a cushion layer disposed below the display panel. The cushion layer includes a plurality of rod parts extending in a thickness direction of the cushion layer and a binder part coupled to the plurality of rod parts.

16 Claims, 22 Drawing Sheets

FIG. 3A
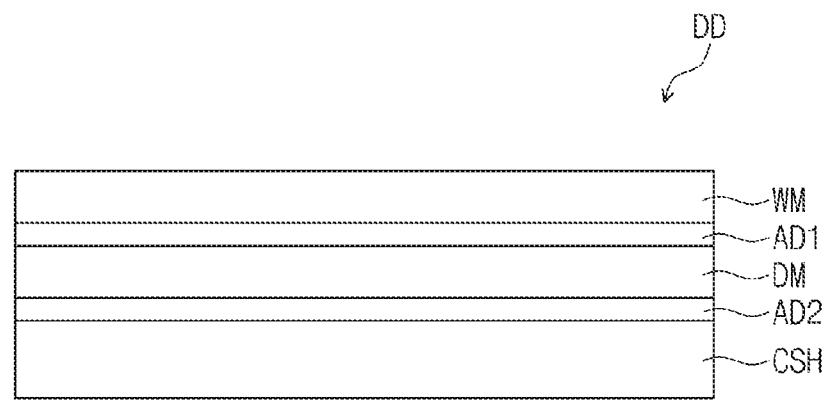
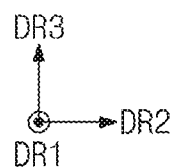
FIG. 3B
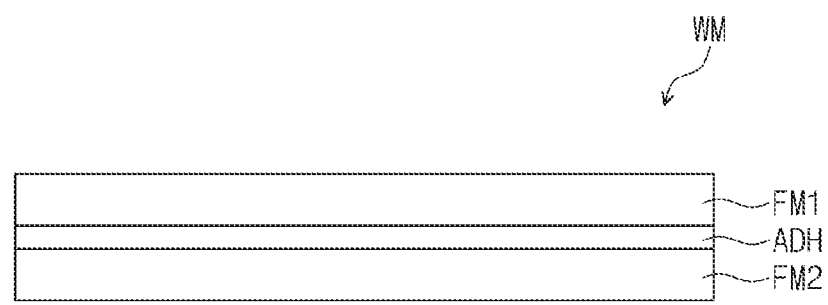
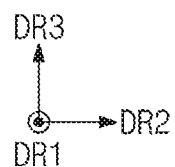

DISPLAY DEVICE INCLUDING CUSHION LAYER

CROSS-REFERENCE TO RELATED APPLICATIONS

This U.S. non-provisional patent application claims priority under 35 U.S.C. § 119 to Korean Patent Application No. 10-2018-0109922, filed on Sep. 14, 2018, the disclosure of which is incorporated by reference herein in its entirety.

TECHNICAL FIELD

Exemplary embodiments of the inventive concept relate to a foldable display device, and more particularly, to a foldable display device having improved flexibility and durability.

DISCUSSION OF THE RELATED ART

A display device displays various images on a display screen to provide information to a user. In recent years, flexible display devices including a foldable flexible display panel have been developed. Flexible display devices may be folded, rolled, or bent, unlike a rigid, non-flexible display device. Since the shape of flexible display devices may be changed, flexible display devices may be portable regardless of their maximum screen size, thus, providing improved convenience for a user.

When a structure allowing for the flexibility of a flexible display device is applied to the flexible display device, the flexible display device may be weakened in durability against impact. Further, when a structure for improving the durability of a flexible display device is applied to the flexible display device to protect against impact, the flexibility of the flexible display device may be degraded.

SUMMARY

Exemplary embodiments of the inventive concept provide a display device having improved durability and flexibility.

According to an exemplary embodiment, a display device includes a window, a display panel disposed below the window, and a cushion layer disposed below the display panel. The cushion layer includes a plurality of rod parts extending in a thickness direction of the cushion layer, and a binder part coupled to the plurality of rod parts.

In an exemplary embodiment, the cushion layer further includes a filling part disposed in a space between the plurality of rod parts and the binder part.

In an exemplary embodiment, each of the rod parts has a first elastic modulus, the filling part has a second elastic modulus, and the first elastic modulus is greater than the second elastic modulus.

In an exemplary embodiment, each of the plurality of rod parts has a cylindrical shape extending in the thickness direction.

In an exemplary embodiment, the plurality of rod parts and the binder part include the same material as each other.

In an exemplary embodiment, the binder part includes a first binder part and a second binder part, and the first binder part and the second binder part are spaced apart from each other in the thickness direction.

In an exemplary embodiment, the display panel includes a folding portion configured to be folded, and a non-folding portion disposed adjacent to the folding portion and configured not to be folded. Further, the plurality of rod parts includes first rod parts and second rod parts, the first rod parts overlap the folding portion on a plane, and the second rod parts overlap the non-folding portion on the plane.

In an exemplary embodiment, a density of the first rod parts is less than a density of the second rod parts.

In an exemplary embodiment, a size of each of the first rod parts is less than a size of each of the second rod parts on the plane.

In an exemplary embodiment, a density of the first rod parts is the same as a density of the second rod parts on the plane.

In an exemplary embodiment, a coupling portion disposed between the binder part and each of the plurality of rod parts is a central portion of each of the rod parts in the thickness direction.

In an exemplary embodiment, a coupling portion disposed between the binder part and each of the plurality of rod parts is disposed between a central portion of each of the plurality of rod parts and the display panel in the thickness direction.

In an exemplary embodiment, a coupling portion disposed between the binder part and each of the plurality of rod parts is disposed at a point farther from the display panel than a central portion of each of the plurality of rod parts in the thickness direction, and the central portion is disposed between the coupling portion and the display panel.

In an exemplary embodiment, each of the plurality of rod parts has an elastic modulus of about 1 GPa or more and about 3 GPa or less.

In an exemplary embodiment, each of the plurality of rod parts includes polyether ether keton (PEEK), polyethylene terephthalate (PET), or polyamide (PA).

According to an exemplary embodiment of the inventive concept, a display device includes a foldable display panel and a cushion layer disposed below the foldable display panel. The cushion layer includes a plurality of rod parts, each having a first elastic modulus and each extending in a thickness direction of the cushion layer, and a filling part having a second elastic modulus less than the first elastic modulus and disposed in a space between the plurality of rod parts.

In an exemplary embodiment, the cushion layer further includes a binder part coupled to the plurality of rod parts.

In an exemplary embodiment, the cushion layer further includes a first binder part coupled to the plurality of rod parts, and a second binder part spaced apart from the first binder part in the thickness direction and coupled to the plurality of rod parts.

In an exemplary embodiment, the foldable display panel includes a folding portion configured to be folded, and a non-folding portion disposed adjacent to the folding portion and configured not to be folded. Further, the plurality of rod parts includes first rod parts and second rod parts, and the first rod parts and the second rod parts have different densities from each other.

In an exemplary embodiment, the foldable display panel includes a folding portion configured to be folded, and a non-folding portion disposed adjacent to the folding portion and configured not to be folded. Further, the plurality of rod parts includes first rod parts and second rod parts, and the first rod parts and the second rod parts have different sizes from each other on a plane.

BRIEF DESCRIPTION OF THE DRAWINGS

The above and other features of the inventive concept will become more apparent by describing in detail exemplary embodiments thereof with reference to the accompanying drawings, in which:

FIG. 3A is a cross-sectional view illustrating a display device according to an exemplary embodiment of the inventive concept.

FIG. 3B is a cross-sectional view illustrating a window of a display device according to an exemplary embodiment of the inventive concept.

DETAILED DESCRIPTION

Figure 1:
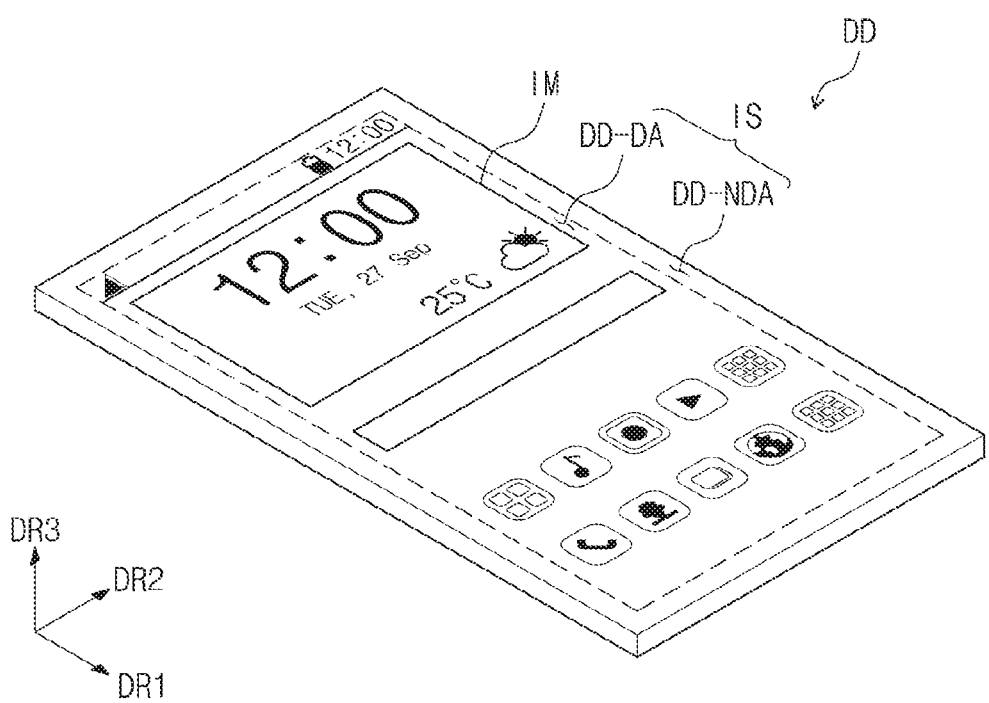
FIG. 1 is a perspective view illustrating a display device according to an exemplary embodiment of the inventive concept.

Exemplary embodiments of the inventive concept will be described more fully hereinafter with reference to the accompanying drawings. Like reference numerals may refer to like elements throughout the accompanying drawings.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component.

It will be understood that although the terms of first and second are used herein to describe various elements, these elements should not be limited by these terms. The terms are only used to distinguish one component from other components. For example, a first element referred to as a first element in one exemplary embodiment can be referred to as a second element in another exemplary embodiment. The terms of a singular form may include plural forms unless the context clearly indicates otherwise.

Spatially relative terms, such as "below", "lower", "above", and "upper", may be used herein for ease of description to describe an element and/or a feature's relationship to another element(s) and/or feature(s) as illustrated in the drawings. The terms are relative concepts and described with respect to the direction indicated in the drawings.

The terms "about" or "approximately" as used herein are inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art.

FIG. 1 is a perspective view illustrating a display device DD according to an exemplary embodiment of the inventive concept.

As illustrated in FIG. 1, a display surface IS on which an image IM is displayed is parallel to a surface defined by a first direction DR1 and a second direction DR2. A normal direction of the display surface IS (e.g., a thickness direction of the display device DD) indicates a third direction DR3. A front surface (or top surface) and a rear surface (or bottom surface) of each of members described herein are distinguished by the third direction DR3. However, directions indicated by the first to third directions DR1, DR2, and DR3 may be a relative concept and may change with respect to each other. Hereinafter, first to third directions may be indicated by the first to third directions DR1, DR2, and DR3 and designated by the same reference numerals, respectively.

The display device DD according to an exemplary embodiment of the inventive concept may be a foldable display device. The display device DD according to an exemplary embodiment of the inventive concept may be used for large-sized electronic equipment such as, for example, televisions and monitors, and small and middle-sized electronic equipment such as, for example, mobile phones, tablet PCs, navigation units for vehicles, game consoles, and smartwatches.

As illustrated in FIG. 1, the display surface IS of the display device DD may include a plurality of areas. For example, the display device DD includes a display area DD-DA in which the image IM is displayed, and a non-display area DD-NDA disposed adjacent to the display area DD-DA and in which an image is not displayed. FIG. 1 illustrates icons of applications and a clock window as an example of the image IM. However, the image IM is not limited thereto. The display area DD-DA may have a rectangular shape. The non-display area DD-NDA may surround the display area DD-DA. However, exemplary embodiments of the inventive concept are not limited thereto. For example, the display area DD-DA and the non-display area DD-NDA may be relatively designed in shape, and the configuration thereof may be varied accordingly.

FIGS. 2A to 2F are views exemplarily illustrating a state in which the display device DD in FIG. 1 may be folded, respectively.

Figure 2A:
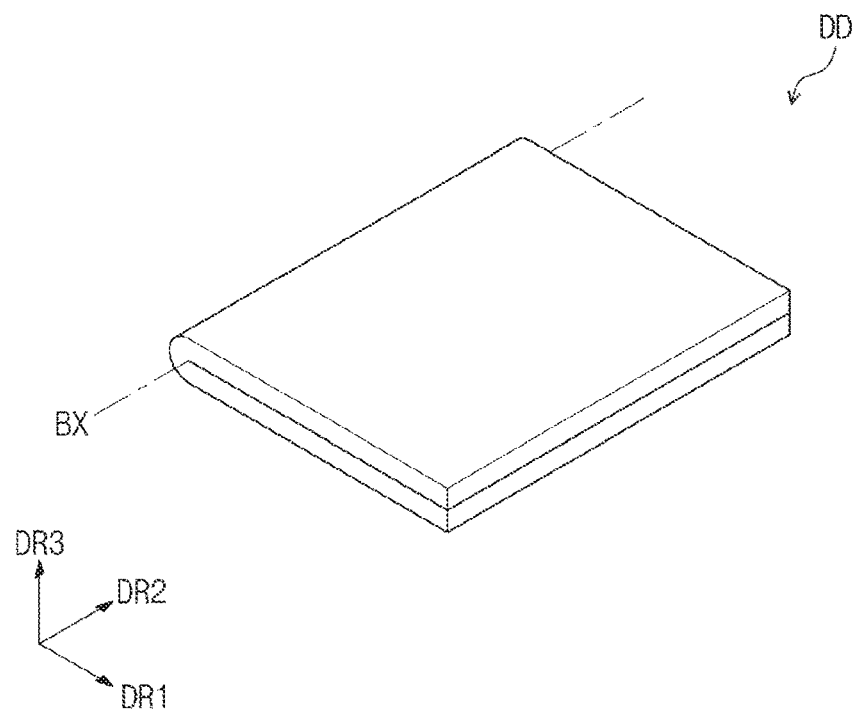
FIGS. 2A to 2F are views exemplarily illustrating a state in which the display device in FIG. 1 may be folded, respectively.

Referring to FIG. 2A, the display device DD according to an exemplary embodiment of the inventive concept may be in-folded with respect to a bending axis BX. For example, the display device DD may be folded such that the display surface IS is folded into itself and is not exposed when the display device DD is in the folded state. The bending axis BX may extend in the second direction DR2. The bending axis BX may be a minor axis of the display device DD.

Figure 2B:
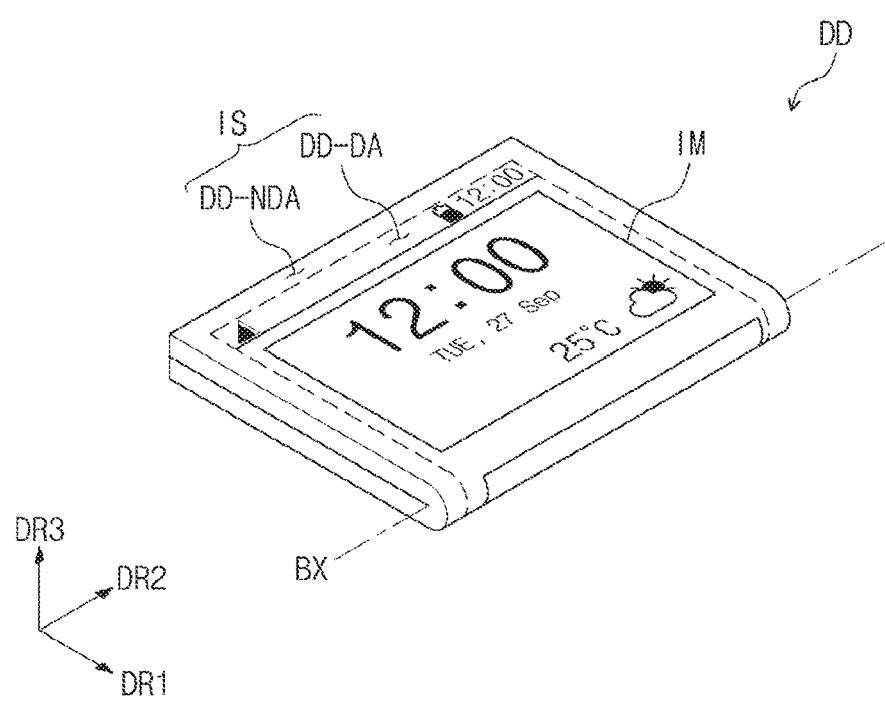

Referring to FIG. 2B, the display device DD according to an exemplary embodiment of the inventive concept may be out-folded with respect to the bending axis BX. For example, the display device DD may be folded such that the display surface IS is exposed when the display device DD is in the folded state.

Figure 2C:
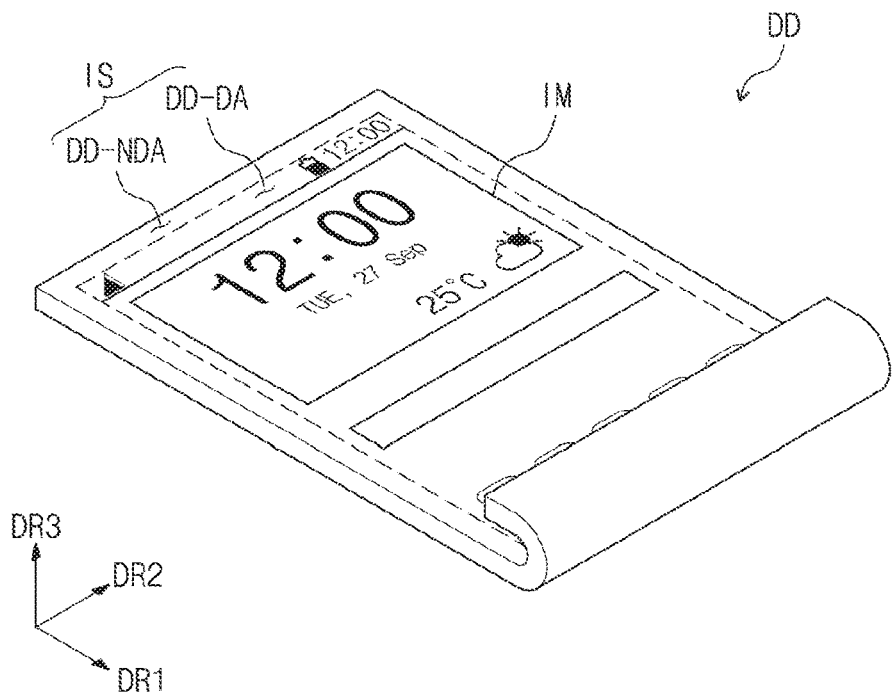

Referring to FIG. 2C, the display device DD according to an exemplary embodiment of the inventive concept may be folded inward from an end of the display device DD. For example, the display device DD may be folded such that a portion of the display device DD near the end of the display device DD is folded into itself and is not exposed when the display device DD is in the folded state. The location of the bending axis BX may be changed in the exemplary embodiment of FIG. 2C compared to the exemplary embodiment of FIG. 2A.

Figure 2D:
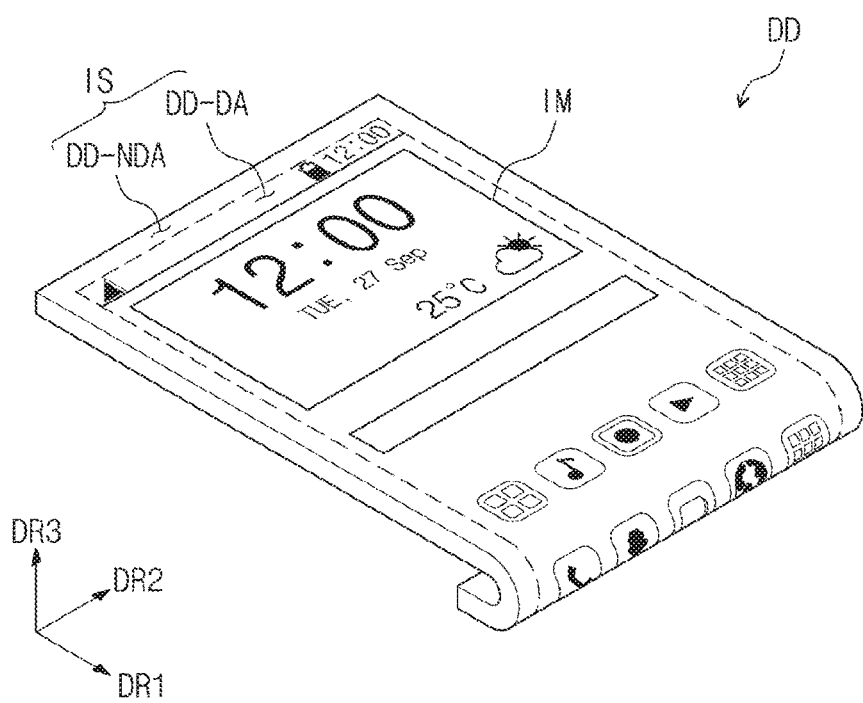

Referring to FIG. 2D, the display device DD according to an exemplary embodiment of the inventive concept may be folded outward from the end of the display device DD. The location of the bending axis BX may be changed in the exemplary embodiment of FIG. 2D compared to the exemplary embodiment of FIG. 2B.

Figure 2E:
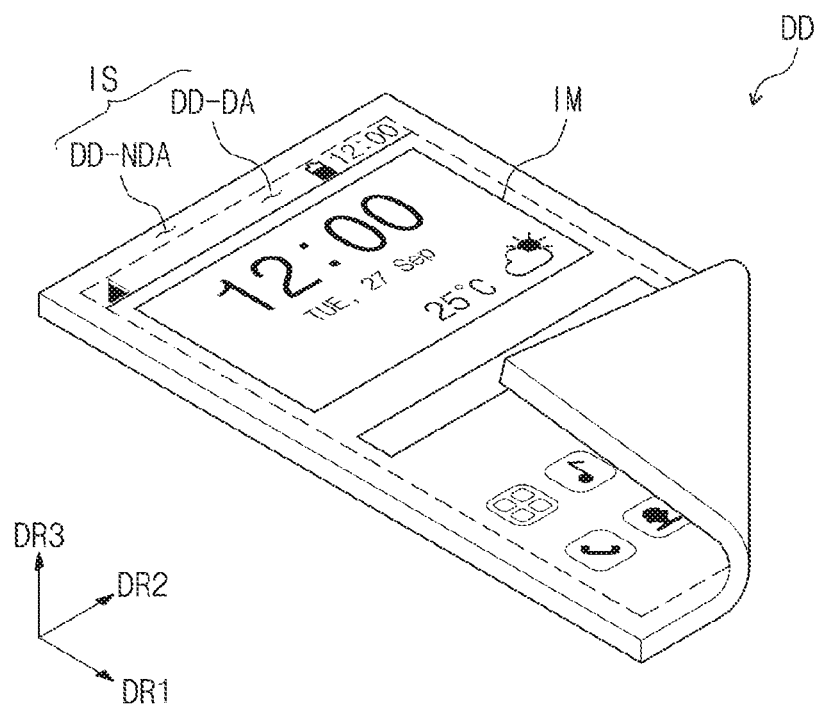

Referring to FIG. 2E, the display device DD according to an exemplary embodiment of the inventive concept may be folded in a diagonal direction.

Figure 2F:
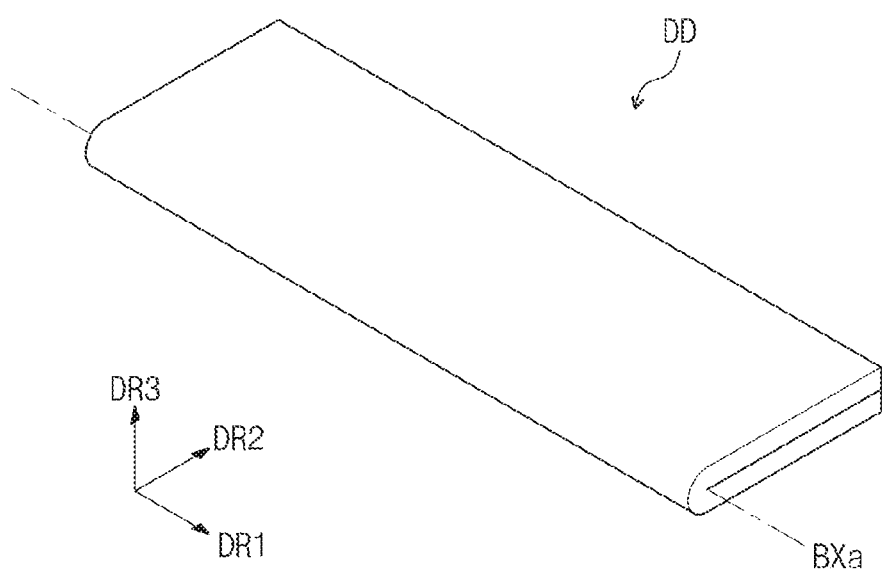

Referring to FIG. 2F, the display device DD according to an exemplary embodiment of the inventive concept may be in-folded or out-folded with respect to a bending axis BXa. Unlike the bending axis BX shown in FIGS. 2A and 2B, which extends in the second direction DR2, the bending axis BXa may extend in the first direction DR1. The bending axis BXa may be a major axis of the display device DD. Although certain different states in which the display device DD may be folded are exemplarily illustrated in FIGS. 2A to 2F, it is to be understood that exemplary embodiments of the inventive concept are not limited thereto.

Figure 3C:
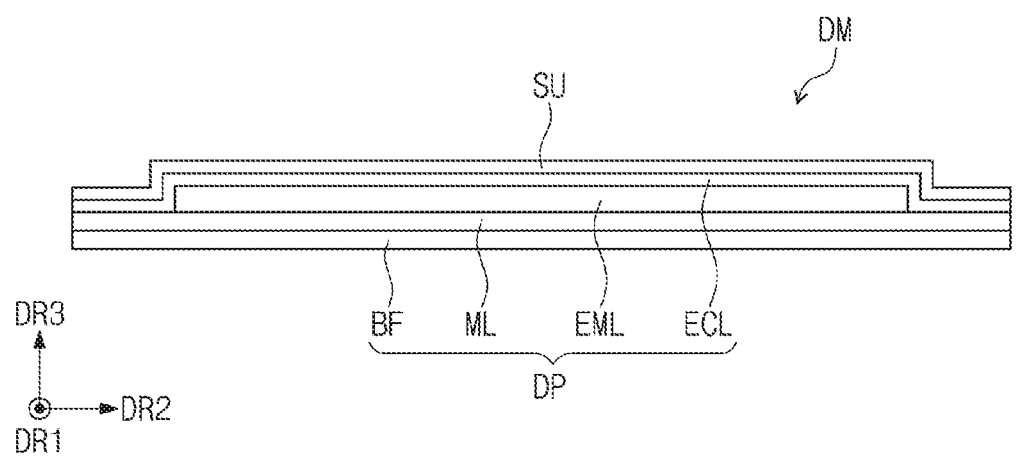
FIG. 3C is a cross-sectional view illustrating a display panel of a display device according to an exemplary embodiment of the inventive concept.

FIG. 3A is a cross-sectional view illustrating a display device according to an exemplary embodiment of the inventive concept. FIG. 3B is a cross-sectional view illustrating a window of a display device according to an exemplary embodiment of the inventive concept. FIG. 3C is a cross-sectional view illustrating a display panel of a display device according to an exemplary embodiment of the inventive concept. FIGS. 3A to 3C illustrate a cross-section defined by the second direction DR2 and the third direction DR3.

The display device DD may include a window WM, a display panel DM, a cushion layer CSH, and a plurality of adhesive layers AD1 and AD2. The plurality of adhesive layers AD1 and AD2 may include a first adhesive layer AD1 and a second adhesive layer AD2. Although FIG. 3A illustrates two adhesive layers AD1 and AD2, exemplary embodiments of the inventive concept are not limited thereto. For example, in exemplary embodiments, one adhesive layer or three or more adhesive layers may be utilized.

The display device DD may have a structure in which the window WM, the first adhesive layer AD1, the display panel DM, the second adhesive layer AD2, and the cushion layer CSH are sequentially laminated. However, exemplary embodiments of the inventive concept are not limited thereto. For example, at least one functional layer may be added thereto. For example, at least one of an impact absorption functional layer for absorbing an impact, a light shielding functional layer for shielding light, a heat dissipation functional layer for dissipating heat, and an electromagnetic interference (EMI) shielding layer for blocking electromagnetic noise may be added between the display panel and the cushion layer CSH according to exemplary embodiments.

Each of the first adhesive layer AD1 and the second adhesive layer AD2 may be, for example, an optically clear adhesive film, an optically clear resin, or a pressure sensitive adhesive film. However, exemplary embodiments of the inventive concept are not limited thereto. In an exemplary embodiment of the inventive concept, at least one of the first adhesive layer AD1 and the second adhesive layer AD2 may be omitted.

The first adhesive layer AD1 may be disposed between the window WM and the display panel DM and attached to each of the window WM and the display panel DM. The second adhesive layer AD2 may be disposed between the display panel DM and the cushion layer CSH and attached to each of the display panel DM and the cushion layer CSH.

The window WM may be disposed above the display panel DM. The window WM may include a flexible material allowing for flexibility of the display device DD.

Referring to FIG. 3B, the window WM may include at least two films FM1 and FM2, and an adhesive layer ADH disposed between and attached to the films FM1 and FM2. In an exemplary embodiment of the inventive concept, the window WM may include a glass having a flexible property or one film. In an exemplary embodiment, the window WM may include a plastic having a flexible property. In an exemplary embodiment, the window WM is transparent.

Each of the first film FM1 and the second film FM2 may include, for example, at least one of polyimide (PI), polyamideimide (PAI), polyether ether keton (PEEK), and polyetherimide (PEI). However, exemplary embodiments of the inventive concept are not limited thereto. In an exemplary embodiment of the inventive concept, the first film FM1 and the second film FM2 may include the same material as each other or different materials from each other.

For example, the first film FM1 and the second film FM2 may include materials having different elastic moduli from each other.

The adhesive layer ADH may be disposed between the first film FM1 and the second film FM2. The adhesive layer ADH may include, for example, an optically clear adhesive film, an optically clear resin, or a pressure sensitive adhesive film. However, exemplary embodiments of the inventive concept are not limited thereto.

Referring to FIG. 3C, the display panel DM may include a display unit DP for displaying an image, and a sensing unit SU for detecting a touch and/or a pressure applied to the display device DD from the outside. The display unit DP may include a plurality of pixels and the associated circuitry and components configured to control the plurality of pixels to display an image. The sensing unit SU may include a plurality of touch sensing electrodes and the associated circuitry and components configured to control the plurality of touch sensing electrodes to detect a touch and/or a pressure applied to the display device DD.

The display unit DP may include a base layer BF, a circuit layer ML, a light emitting element layer EML, and a thin-film encapsulation layer ECL. Although the display unit DP is described herein as being an organic light emitting display panel, exemplary embodiments of the inventive concept are not limited thereto.

The base layer BF may be a laminated structure including, for example, a silicon substrate, a glass substrate, an insulation film, or a plurality of insulation layers.

The circuit layer ML may be disposed on the base layer BF. The circuit layer ML may include a plurality of insulation layers, a plurality of conductive layers, and a semiconductor layer.

The light emitting element layer EML may be disposed on the circuit layer ML. The light emitting element layer EML includes a display element such as, for example, organic light emitting diodes. However, exemplary embodiments of the inventive concept are not limited thereto. For example, the light emitting element layer EML may include inorganic light emitting diodes or organic-inorganic hybrid light emitting diodes according to the type of the display panel DP.

The thin-film encapsulation layer ECL seals the light emitting element layer EML. The thin-film encapsulation layer ECL includes a plurality of inorganic layers and at least one organic layer disposed therebetween. The inorganic layers protect the light emitting element layer EML from moisture and oxygen, and the organic layer protects the light emitting element layer EML from foreign substances such as dust particles.

The thin-film encapsulation layer ECL may further include a buffer layer. The buffer layer may be a layer closest to the sensing unit SU. The buffer layer may be, for example, an inorganic layer or an organic layer. When the buffer layer is an inorganic layer, the inorganic layer may include, for example, at least one of a silicon nitride, a silicon oxynitride, a silicon oxide, a titanium oxide, and an aluminum oxide. When the buffer layer is an organic layer, the organic layer may include a polymer such as, for example, an acrylic-based organic layer. However, exemplary embodiments of the inventive concept are not limited thereto.

The sensing unit SU may include a circuit for detecting a touch. A touch detecting method of the sensing unit SU may include, for example, a resistive layer method, an optical method, a capacitive method, and an ultrasonic method. However, exemplary embodiments of the inventive concept are not limited thereto. Among the above-described touch detecting methods, a capacitive sensing unit SU may detect whether a touch is generated by using capacitance that is varied when a touch generation unit touches a screen of the display device DD. The capacitive method may be, for example, a mutual capacitive method or a self-capacitive method.

The sensing unit SU may be disposed directly on the display unit DP. The expression "disposed directly" refers to being formed through a continuous process excluding a process of attaching by using a separate adhesive member. However, exemplary embodiments of the inventive concept are not limited thereto. For example, in exemplary embodiments, the display unit DP and the sensing unit SU may be coupled to each other by using an adhesive member.

Referring again to FIG. 3A, the cushion layer CSH may be disposed below the display panel DM. The cushion layer CSH may include a polymer material. The cushion layer CSH may be a layer that absorbs an impact applied from the outside. The cushion layer CSH will be described in further detail below.

Figure 4A:
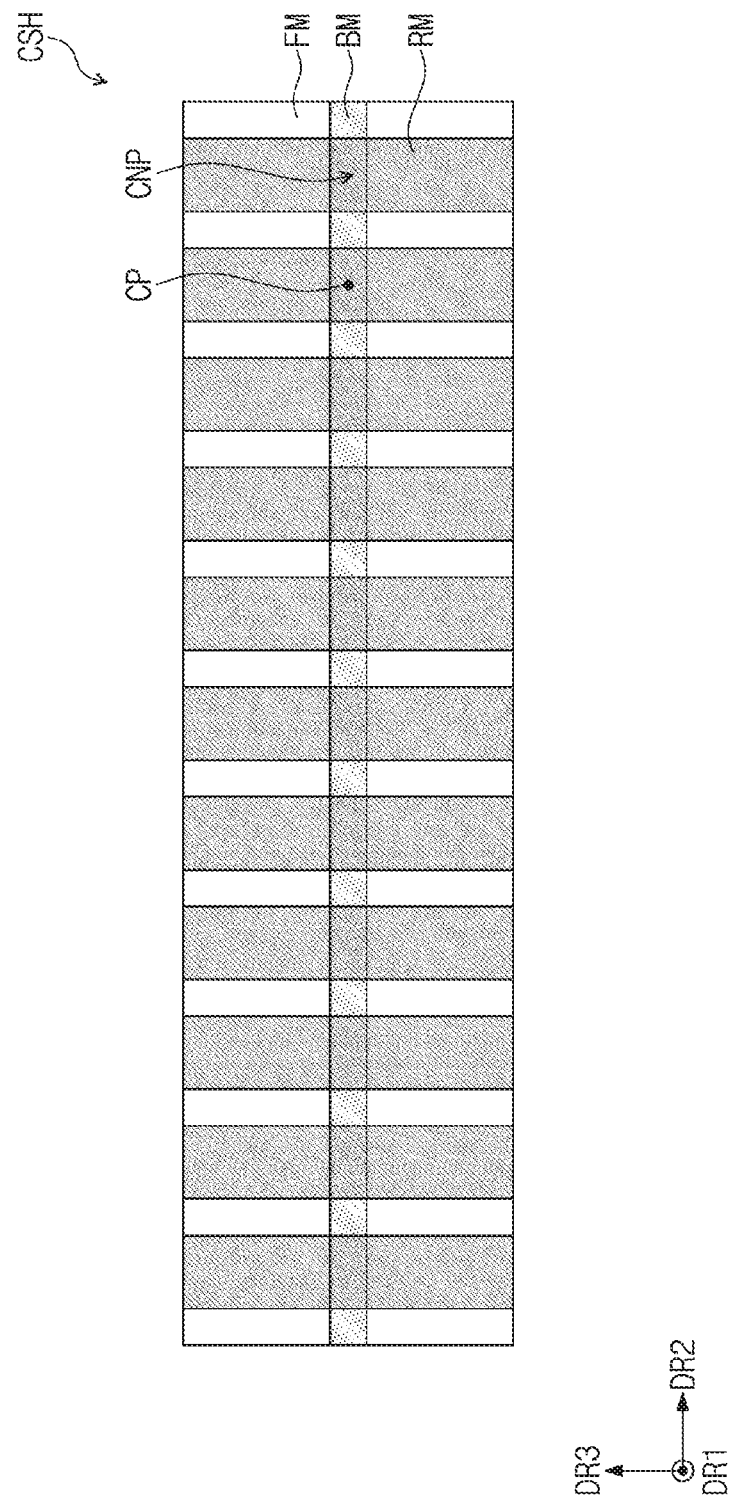
FIG. 4A is a cross-sectional view illustrating a cushion layer of a display device according to an exemplary embodiment of the inventive concept.
Figure 4B:
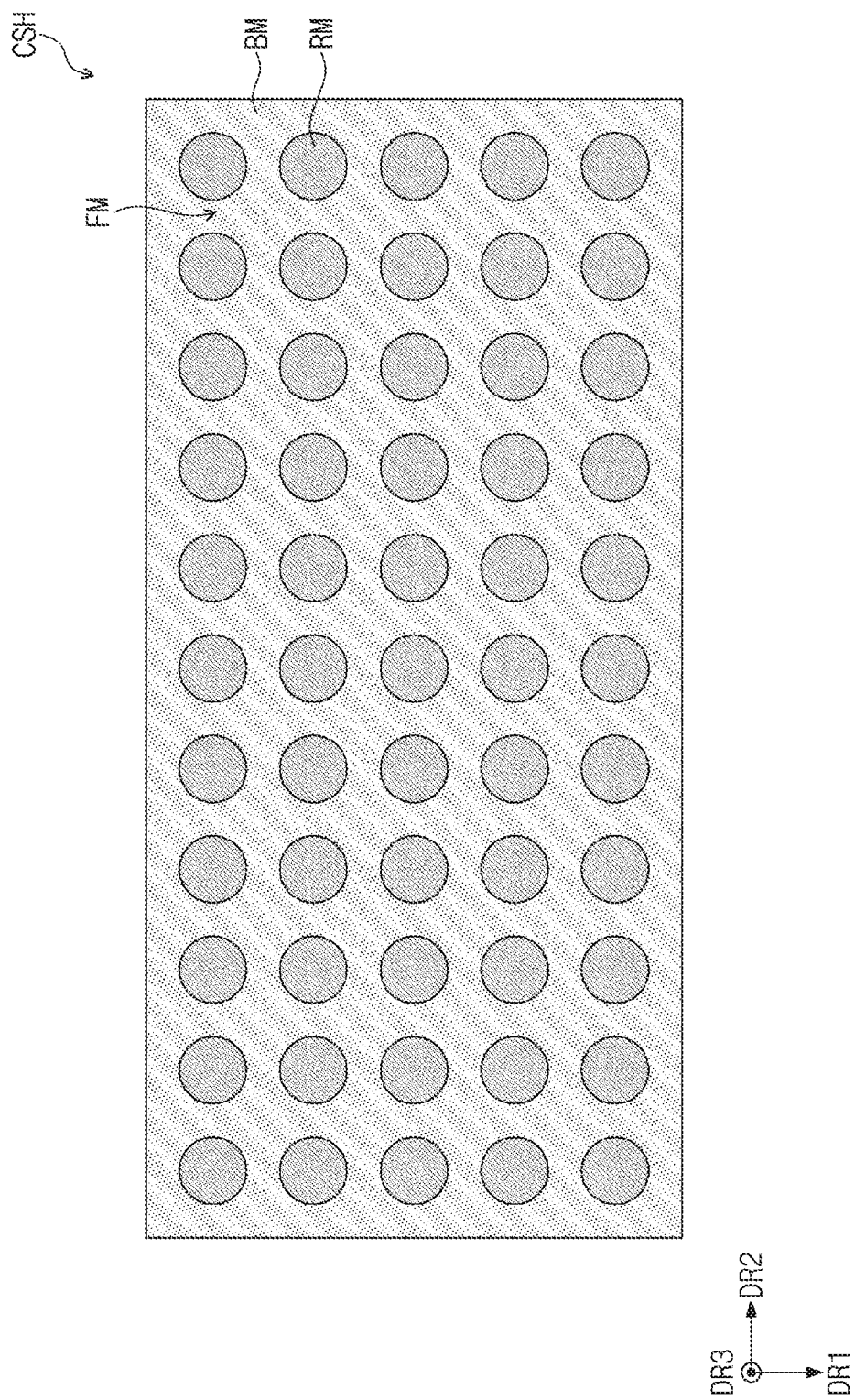
FIG. 4B is a plan view illustrating a cushion layer of a display device according to an exemplary embodiment of the inventive concept.
Figure 4C:
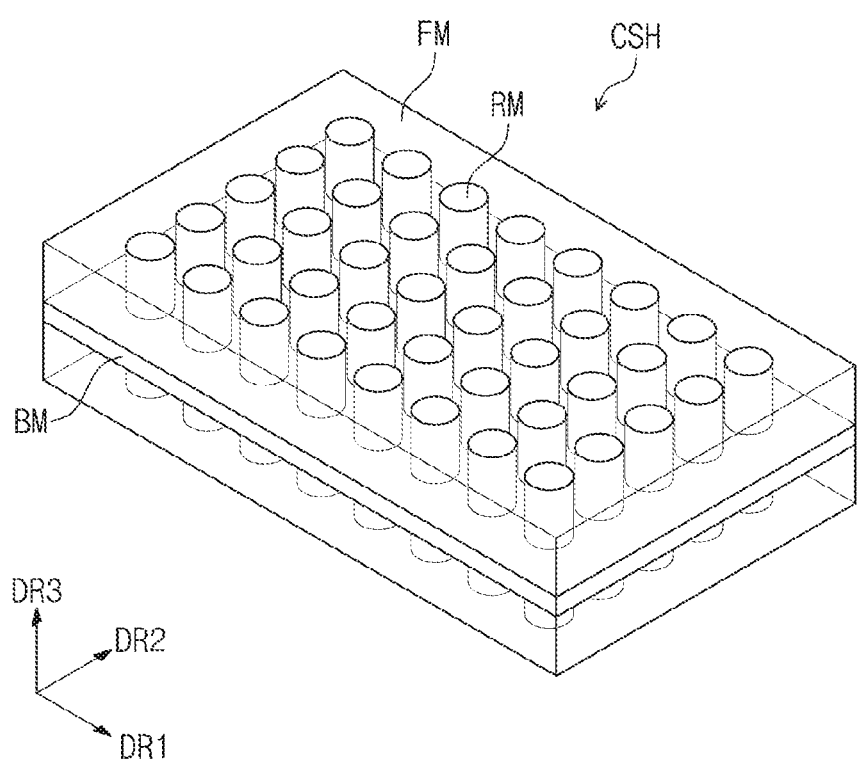
FIG. 4C is a perspective view illustrating a cushion layer of a display device according to an exemplary embodiment of the inventive concept.

FIG. 4A is a cross-sectional view illustrating the cushion layer CSH according to an exemplary embodiment of the inventive concept. FIG. 4B is a plan view illustrating the cushion layer CSH according to an exemplary embodiment of the inventive concept. FIG. 4C is a perspective view illustrating the cushion layer CSH according to an exemplary embodiment of the inventive concept.

Referring to FIGS. 4A, 4B, and 4C, the cushion layer CSH may include a plurality of rod parts RM, a binder part BM, and a filling part FM.

Each of the plurality of rod parts RM may extend in a thickness direction of the cushion layer CSH. For example, each of the plurality of rod parts RM may extend in the third direction DR3. In an exemplary embodiment of the inventive concept, each of the plurality of rod parts RM may have a cylindrical shape. However, exemplary embodiments of the inventive concept are not limited thereto. For example, according to exemplary embodiments, each of the plurality of rod parts RM may have a polygonal cylinder shape, and each of the plurality of rod parts RM may have a polygonal shape such as a triangle, a rectangle, a pentagon, a hexagon, an octagon, etc. on a plane.

Each of the plurality of rod parts RM may have a length of about 300 μm in the thickness direction (e.g., the third direction DR3). However, exemplary embodiments of the inventive concept are not limited thereto.

The plurality of rod parts RM may be arranged under a predetermined rule on a plane. For example, the plurality of rod parts RM may be arranged in the first direction DR1 and the second direction DR2.

Each of the plurality of rod parts RM may include, for example, polyether ether keton (PEEK), polyethylene terephthalate (PET), or polyamide (PA). However, exemplary embodiments of the inventive concept are not limited thereto. For example, each of the plurality of rod parts RM may be selected from plastic materials having properties of low deformation and high elongation. For example, each of the plurality of rod parts RM may be selected from plastic materials having a deformation property lower than that of the filling part FM. The display panel DM may include, for example, a polyimide (PI) film or a glass. Here, the polyimide film may have an elastic modulus of about 3 GPa, and the glass may have an elastic modulus of about 60 GPa. Each of the plurality of rod parts RM may be selected from materials each having an elastic modulus less than that of the material forming the display panel DM. For example, each of the plurality of rod parts RM may be selected from materials each having an elongation property greater than that of the polyimide film or the glass.

The binder part BM may be coupled to the plurality of rod parts RM. The binder part BM may have, for example, a planar shape parallel to a plane defined by the first direction DR1 and the second direction DR2. The binder part BM may include the same material as the plurality of rod parts RM. The binder part BM may be integrated with the plurality of rod parts RM. In exemplary embodiments, the plurality of rod parts RM may penetrate the binder part BM, and may be attached to the binder part BM at the point of penetration.

A coupling portion CNP coupled to the binder part BM and each of the rod parts RM may be a central portion CP of a thickness direction of each of the rod parts RM, e.g., the third direction DR3. That is the binder part BM may be coupled to the central portion CP of each of the rod parts RM. For example, the binder part BM may be coupled to each of the rod parts RM via the coupling portion CNP at a location corresponding to the central portion CP of the rod parts RM in the third direction DR3. For example, the binder part BM may be disposed at the central portion CP of the rod parts RM in the third direction DR3, and connected to the rod parts RM at the central portion CP.

The filling part FM may be disposed in a space between the plurality of rod parts RM and the binder part BM. In an exemplary embodiment, the filling part FM may be disposed in any remaining portions of the cushion layer CSH that are not occupied by the rod parts RM and the binder part BM. The filling part FM may have a flexible property greater than that of each of the plurality of rod parts RM. For example, the filling part FM may include acrylic, polyurethane (PU), or a silicone-based flexible material. However, exemplary embodiments of the inventive concept are not limited thereto. For example, the filling part FM may be selected from materials having a flexible material greater than that of the plurality of rod parts RM.

Each of the plurality of rod parts RM may have a first elastic modulus, the binder part BM may have a second elastic modulus, and the filling part FM may have a third elastic modulus. Each of the first elastic modulus and the second elastic modulus may be greater than the third elastic modulus. The first elastic modulus may be the same as the second elastic modulus. For example, the first elastic modulus may be about 1 GPa or more and about 3 GPa or less. The third elastic modulus may be several KPa or more and several MPa or less.

According to an exemplary embodiment of the inventive concept, each of the plurality of rod parts RM may have an elastic modulus greater than that of the filling part FM. As a result, the display panel DM (refer to FIG. 3A) may be prevented from being damaged by an external impact, or the damage caused by an external impact may be reduced. The filling part FM may have a flexible property and be deformed in correspondence to deformation of the display panel DM (refer to FIG. 3A). Accordingly, both impact and flexibility properties of the display device DD (refer to FIG. 3A) may be improved. Improving the impact property of the display device DD refers to reducing the possibility of damage occurring to the display panel DM (refer to FIG. 3A) as the result of an impact.

The plurality of rod parts RM and the binder part BM may be formed by using a film having a predetermined thickness. For example, the rod parts RM and the binder part BM may be formed by forming a micro-pattern on one film, in which the micro-pattern is the rod parts RM. A method of forming the micro-pattern may include, for example, a laser direct processing method or an ultraviolet lithography method using a photo-mask. The laser direct processing method may form the plurality of rod parts RM by removing a region on which the plurality of rod parts RM are formed. In exemplary embodiments, the plurality of rod parts RM and the binder part BM are formed, and then the filling part FM is formed by coating and curing an empty portion. However, exemplary embodiments of the inventive concept are not limited thereto.

Figure 5A:
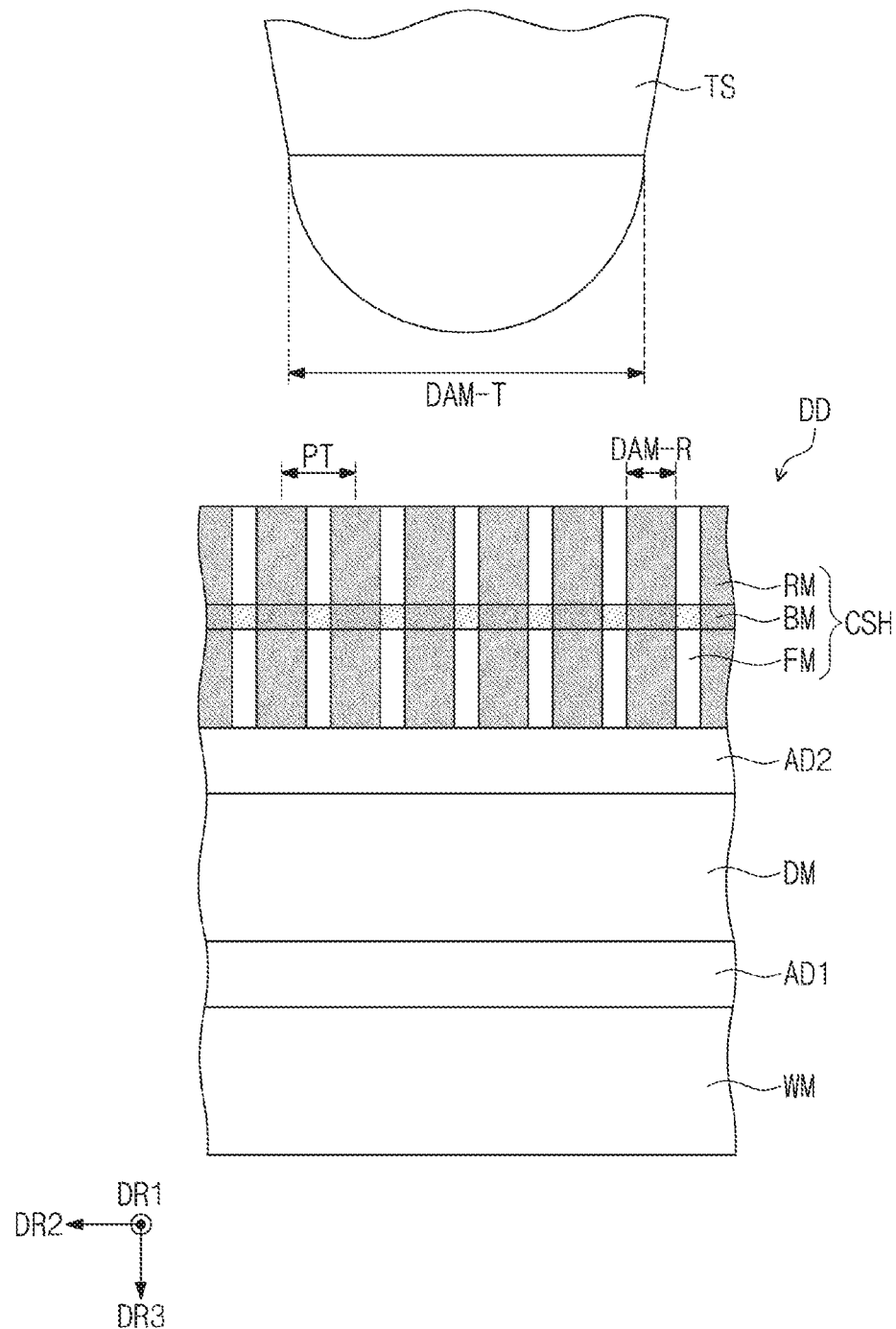
FIG. 5A is a schematic cross-sectional view illustrating an impact property test process according to an exemplary embodiment of the inventive concept.
Figure 5B:
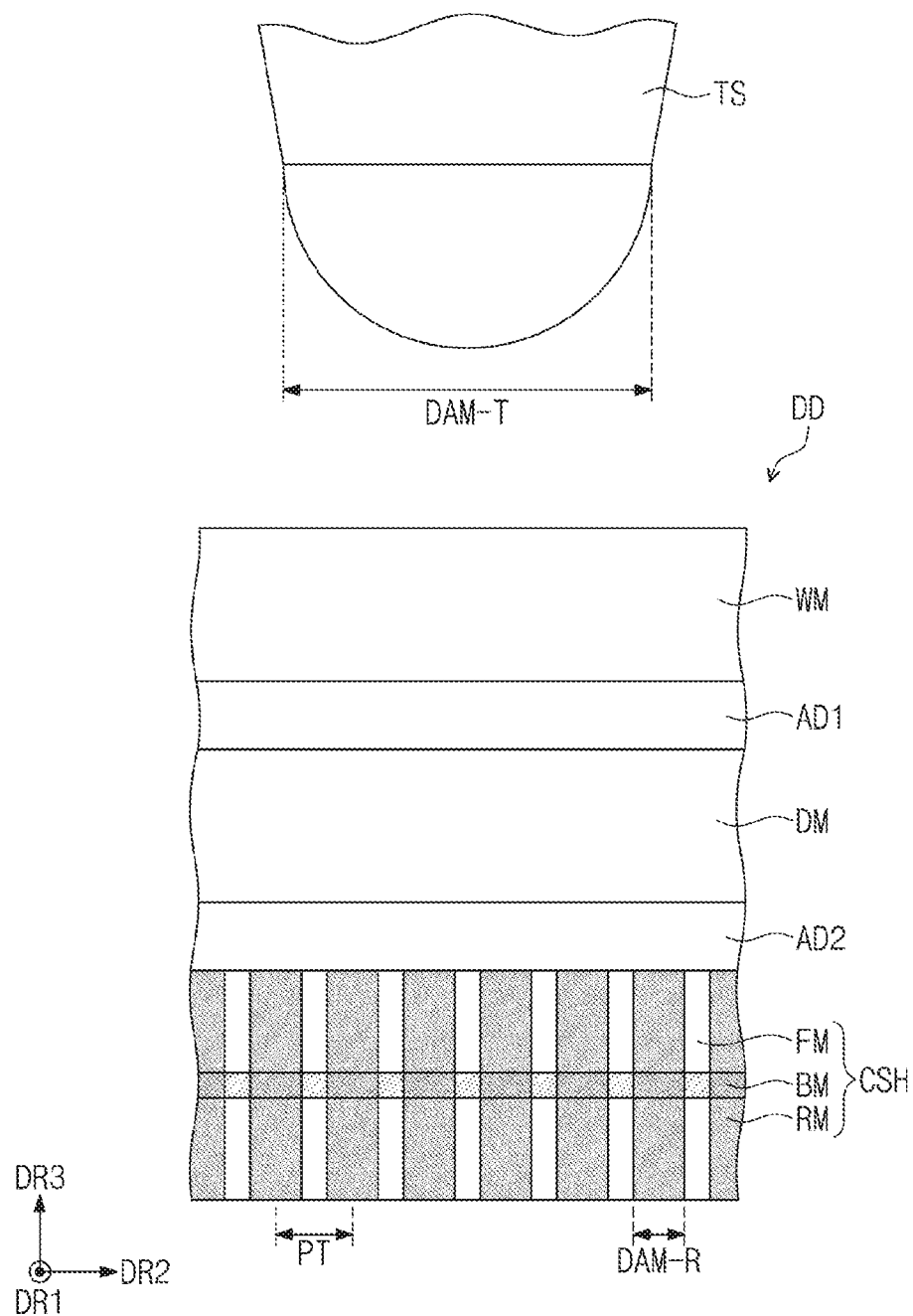
FIG. 5B is a schematic cross-sectional view illustrating an impact property test process according to an exemplary embodiment of the inventive concept.
Figure 5C:
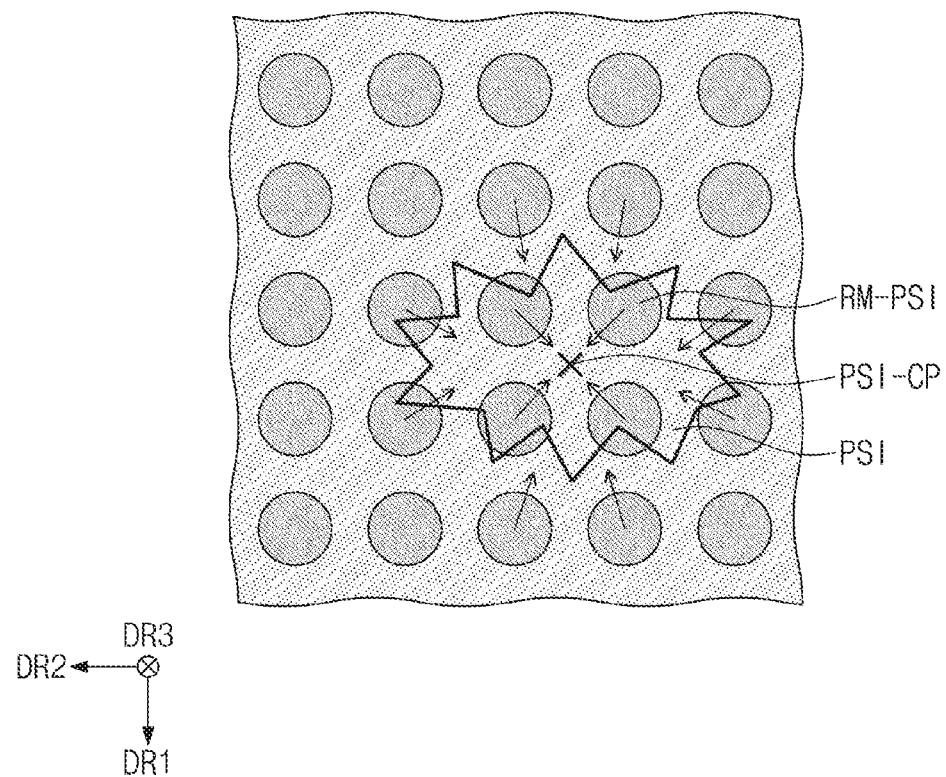
FIG. 5C is a plan view illustrating a cushion layer to which an impact is applied according to an exemplary embodiment of the inventive concept.

FIG. 5A is a schematic cross-sectional view illustrating an impact property test process according to an exemplary embodiment of the inventive concept. FIG. 5B is a schematic cross-sectional view illustrating an impact property test process according to an exemplary embodiment of the inventive concept. FIG. 5C is a plan view illustrating the cushion layer to which an impact is applied according to an exemplary embodiment of the inventive concept.

Referring to FIG. 5A, an impact may be applied to a rear surface of the display device DD, and more specifically, to the cushion layer CSH of the display device DD, by using a test member TS. Referring to FIG. 5B, an impact may be applied to a top surface of the display device DD, and more specifically, to the window member WM of the display device DD, by using the test member TS.

The test member TS may be, for example, a ball or a pen. The test member TS may have a diameter DAM-T. The diameter DAM-T may be, for example, about 400 μm.

A pitch PT between adjacent rod parts RM from among the plurality of rod parts RM may be determined according to the diameter DAM-T of the test member TS. For example, the pitch PT may be one-fourth or less of the diameter DAM-T of the test member TS. For example, the pitch PT may be about 100 μm or less according to exemplary embodiments, and more specifically, the pitch PT may be about 60 μm according to exemplary embodiments. The smaller the pitch PT is, the greater the number of rod parts RM that may be arranged. Accordingly, the display device DD (refer to FIG. 3A) may be improved in impact property.

Each of the plurality of rod parts RM may have a diameter DAM-R that is determined after the pitch T is determined. For example, the diameter DAM-R may be about 20 μm to about 40 μm. For example, when the pitch PT is about 60 μm, the diameter DAM-R may be less than about 30 μm. For example, the diameter DAM-R may be equal to or greater than about 20 μm and less than about 30 μm.

FIG. 5C exemplarily illustrates an impact area PSI to which a physical impact is applied. The physical impact may be applied, for example, by the test member TS during the impact property test process. An impact origin PSI-CP at which the greatest physical impact is applied may be defined in the impact area PSI. A plurality of rod parts RM-PSI disposed adjacent to the impact origin PSI-CP may be gathered in a direction toward the impact origin PSI-CP. For example, when the impact is applied, rod parts RM closest to the impact origin PSI-CP (e.g., the plurality of rod parts RM-PSI disposed adjacent to the impact origin PSI-CP) may move toward the impact origin PSI-CP in response to the impact. The plurality of rod parts RM-PSI may relieve the physical impact, which may prevent the display panel DM from being damaged or reduce the amount of damage caused to the display panel DM. Since the plurality of rod parts RM-PSI is coupled to the binder part BM, the plurality of rod parts RM-PSI may be prevented from being deviated from a specific position. For example, the plurality of rod parts RM-PSI may be gathered in a direction toward the impact origin PSI-CP in response to an impact being applied, but may only move a certain amount. For example, a limit to the amount of movement of the plurality of rod parts RM-PSI may exist due to the plurality of rod parts RM-PSI being coupled to the binder part BM. Accordingly, the cushion layer CSH may have an improved impact absorption performance.

When an impact is applied to the top surface of the display device DD, as shown in FIG. 5B, the plurality of rod parts RM-PSI may support a bottom surface of the display panel DM against the impact. Accordingly, the rod parts RM-PSI may prevent the window WM and the display panel DM from being deformed in shape. As a result, various types of damage may be prevented from occurring as a result of the impact. For example, a phenomenon in which a bright spot is generated in the display panel DM, and/or a crack is generated in the window WM, may be prevented.

Figure 5D:
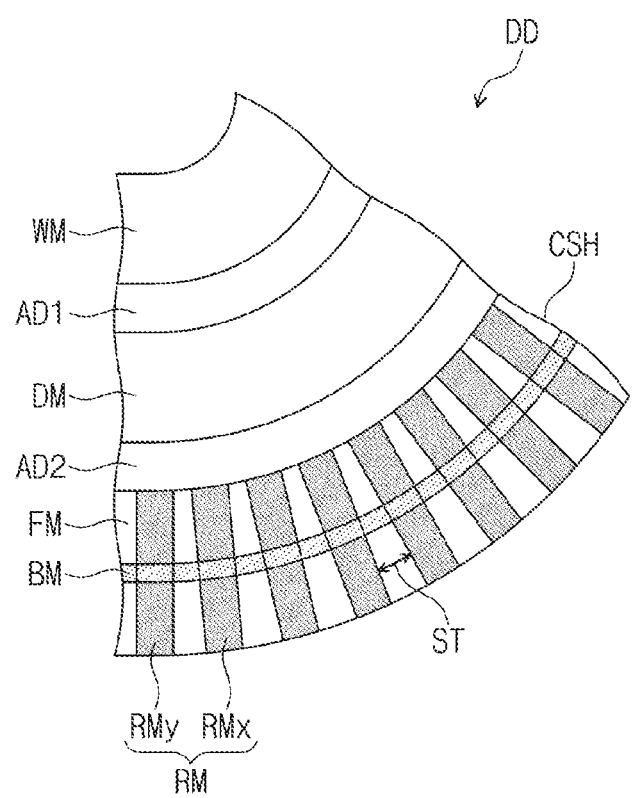
FIG. 5D is a cross-sectional view illustrating a portion of a display device according to an exemplary embodiment of the inventive concept.

FIG. 5D is a cross-sectional view illustrating a portion of the display device DD according to an exemplary embodiment of the inventive concept. More specifically, FIG. 5D is an enlarged view illustrating one portion of the display device DD when folded.

Referring to FIG. 5D, as the display device DD is folded, a stress ST may be generated in one portion of the cushion layer CSH. The stress ST may be a tensile stress. A shape of the filling part FM of the cushion layer CSH may be partially deformed in correspondence to the tensile stress. For example, an area of the filling part FM to which the tensile stress is applied may be extended as a result of the tensile stress. As the filling part FM is extended, a gap between rod parts RMx and RMy, which are adjacent to each other, may increase. According to an exemplary embodiment of the inventive concept, flexibility may be improved by the rod parts RM, which are spaced apart from each other, and the filling part FM filled therebetween. Accordingly, a possibility of generating defects such as, for example, a crack and a buckling phenomenon in a portion of the components of the display device DD, may be reduced.

Figure 6:
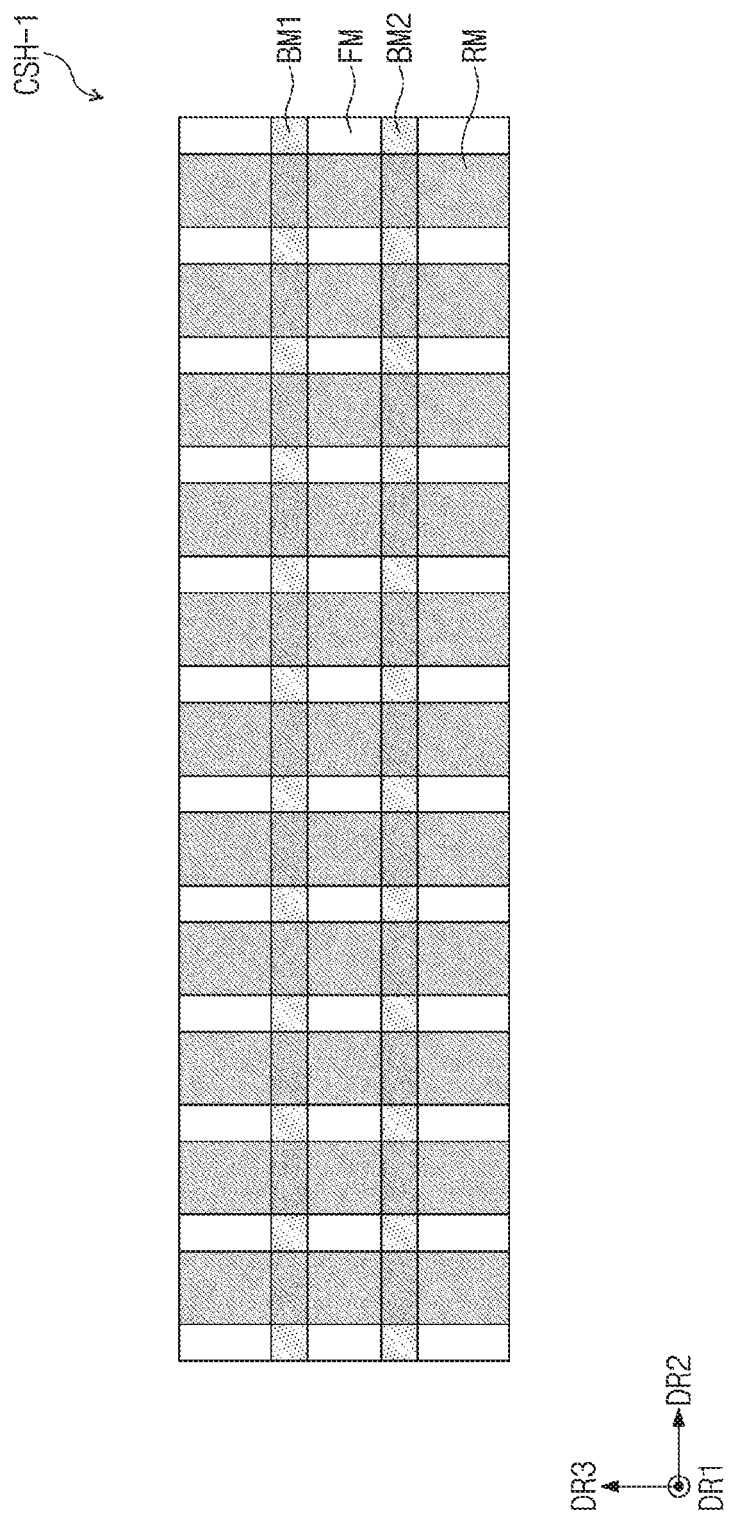
FIG. 6 is a cross-sectional view illustrating a cushion layer according to an exemplary embodiment of the inventive concept.

FIG. 6 is a cross-sectional view illustrating a cushion layer CSH-1 according to an exemplary embodiment of the inventive concept. For convenience of explanation, in describing FIG. 6, the same or similar reference numerals may be used to denote the same components previously described, and a further description of components and technical aspects previously described may be omitted.

Referring to FIG. 6, the cushion layer CSH-1 may include a plurality of rod parts RM, a first binder part BM1, a second binder part BM2, and a filling part FM.

Each of the first binder part BM1 and the second binder part BM2 may be coupled to a plurality of rod parts RM. The first binder part BM1 and the second binder part BM2 may be spaced apart from each other in the thickness direction (e.g., the third direction DR3).

When each of the plurality of rod parts RM has a length of about 300 μm in the third direction DR3, the first binder part BM1 and the second binder part BM2 may be spaced about 80 μm to about 100 μm from each other.

According to an exemplary embodiment of the inventive concept, since the plurality of binder parts (e.g., the first binder part BM1 and the second binder part BM2) are coupled to each of the plurality of rod parts RM, the plurality of rod parts RM may be prevented from being deformed or separated. For example, utilization of the plurality of binder parts (e.g., the first binder part BM1 and the second binder part BM2) may allow for the plurality of rod parts RM to move a certain amount in response to an impact, but to have a limit in regards to the amount of movement. Accordingly, the cushion layer CSH-1 may have an improved impact absorption performance.

Figure 7:
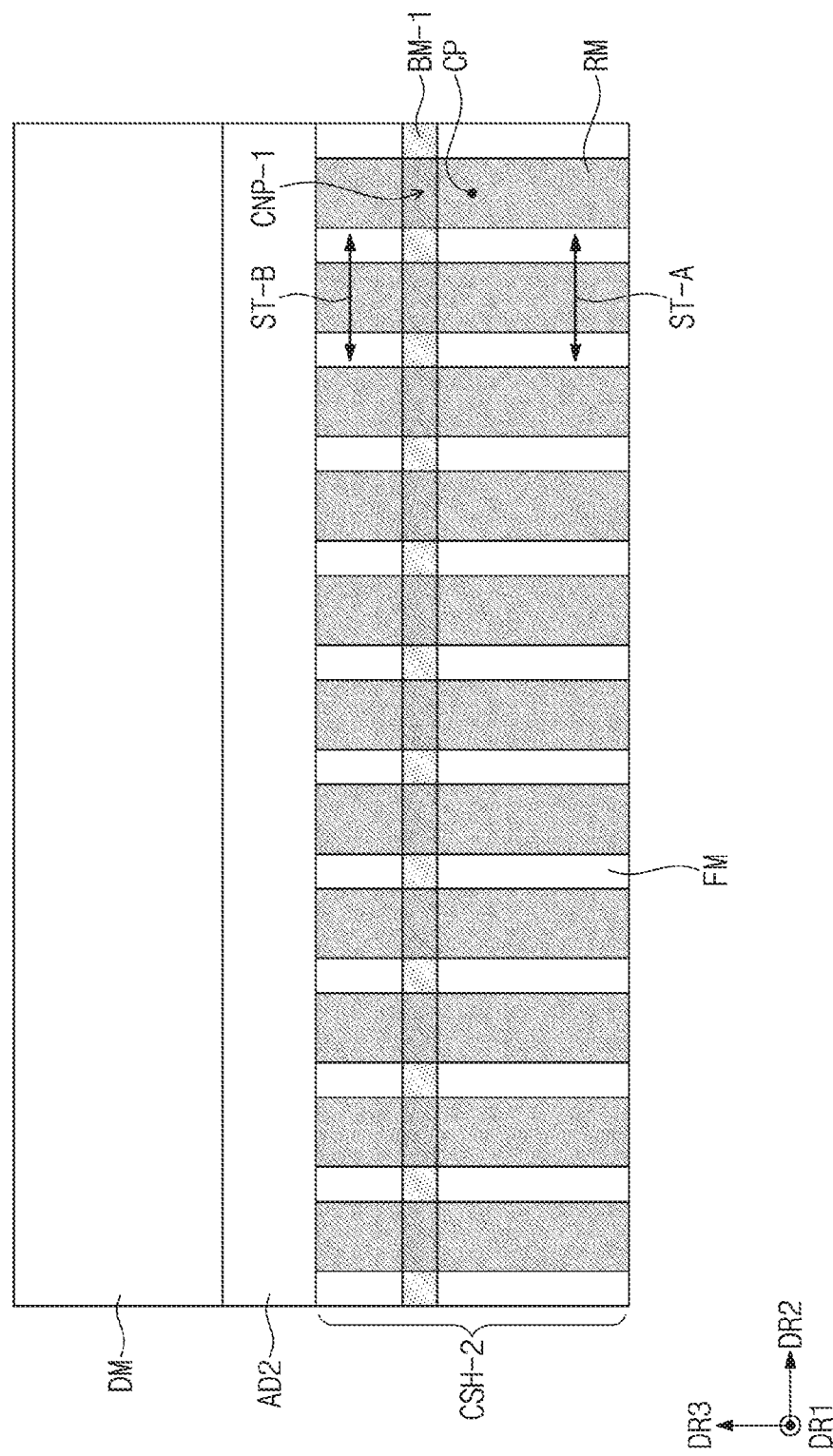
FIG. 7 is a cross-sectional view illustrating a cushion layer according to an exemplary embodiment of the inventive concept.

FIG. 7 is a cross-sectional view illustrating a cushion layer CSH-2 according to an exemplary embodiment of the inventive concept. For convenience of explanation, in describing FIG. 7, the same or similar reference numerals may be used to denote the same components previously described, and a further description of components and technical aspects previously described may be omitted.

Referring to FIG. 7, the cushion layer CSH-2 may include a plurality of rod parts RM, a binder part BM-1, and a filling part FM.

A coupling portion CNP-1 coupled to the binder part BM-1 and each of the rod parts RM may be different from a central portion CP in a thickness direction of each of the rod parts RM (e.g., in the third direction DR3). For example, the coupling portion CNP-1 may be disposed between the display panel DM and the central portion CP. The coupling portion CNP-1 may be disposed at a point farther from the display panel DM than the central portion CP. For example, a distance between the coupling portion CNP-1 and the display panel DM may be greater than a distance between the coupling portion CNP-1 and the central portion CP. For example, the binder part BM-1 may be coupled to each of the rod parts RM via the coupling portion CNP-1 at a location between the central portion CP of the rod parts RM and the display panel DM in the third direction DR3. For example, the binder part BM-1 may be disposed between the central portion CP of the rod parts RM and the display panel DM in the third direction DR3, and connected to the rod parts RM between the central portion CP and the display panel DM.

For example, referring to FIGS. 2A and 7, when the display device DD is in-folded, a stress ST-A applied to an area below the central portion CP may be greater than a stress ST-B applied to an area above the central portion CP. The binder part BM-1 may be disposed on a portion to which a relatively smaller stress is applied when the display device DD is folded.

Figure 8:
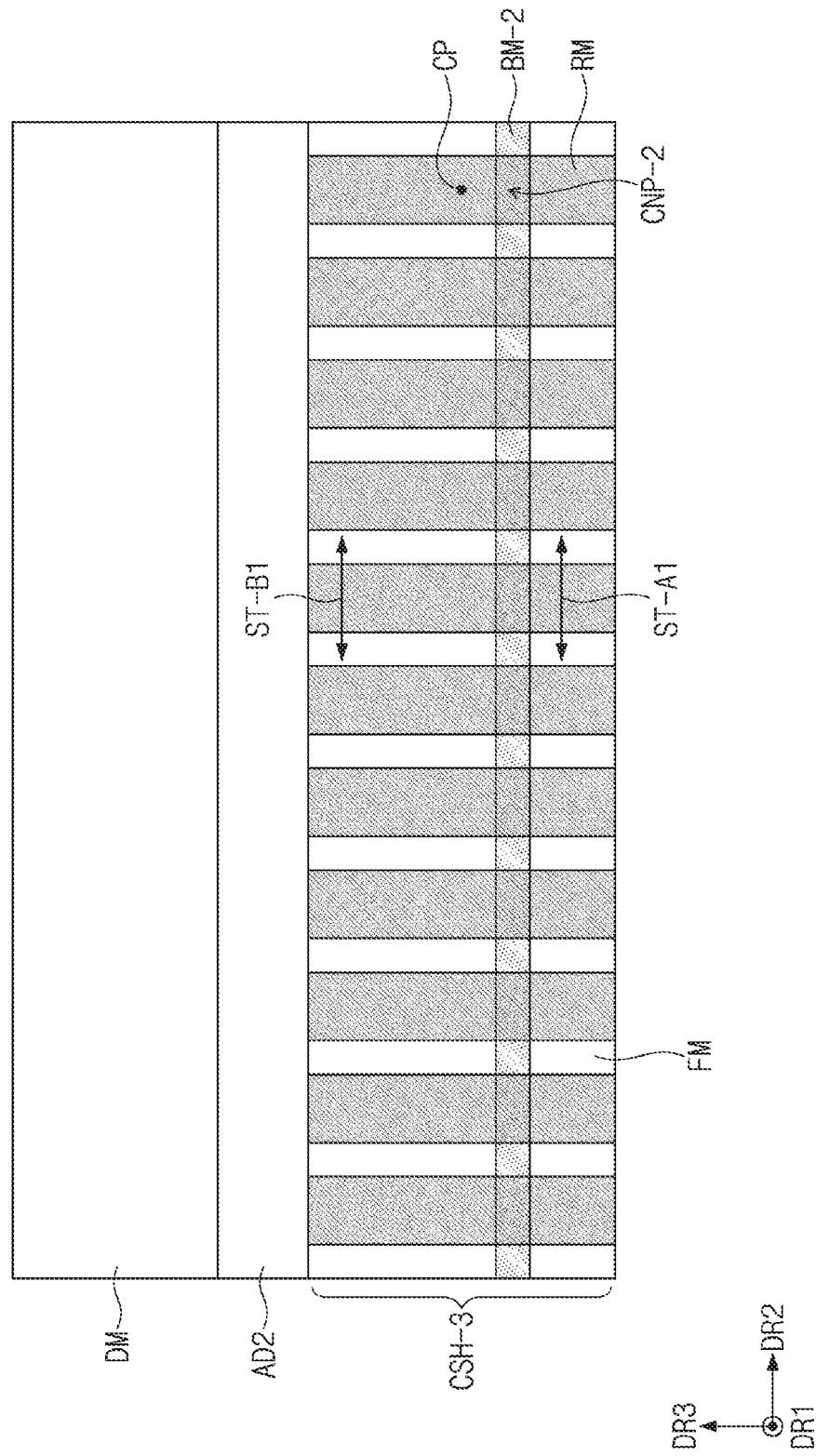
FIG. 8 is a cross-sectional view illustrating a cushion layer according to an exemplary embodiment of the inventive concept.

FIG. 8 is a cross-sectional view illustrating a cushion layer CSH-3 according to an exemplary embodiment of the inventive concept. For convenience of explanation, in describing FIG. 8, the same or similar reference numerals may be used to denote the same components previously described, and a further description of components and technical aspects previously described may be omitted.

Referring to FIG. 8, the cushion layer CSH-3 may include a plurality of rod parts RM, a binder part BM-2, and a filling part FM.

A coupling portion CNP-2 coupled to the binder part BM-2 and each of the rod parts RM may be different from a central portion CP in the thickness direction of each of the rod parts RM (e.g., in the third direction DR3). For example, the coupling portion CNP-2 may be disposed below the central portion CP. For example, a distance between the coupling portion CNP-2 and the display panel DM may be greater than a distance between the central portion CP an the display panel DM.

For example, referring to FIGS. 2B and 8, when the display device DD is out-folded, a stress ST-A1 applied to an area below the central portion CP may be less than a stress ST-B1 applied to an area above the central portion CP. The binder part BM-2 may be disposed on a portion to which a relatively smaller stress is applied when the display device DD is folded.

Figure 9:
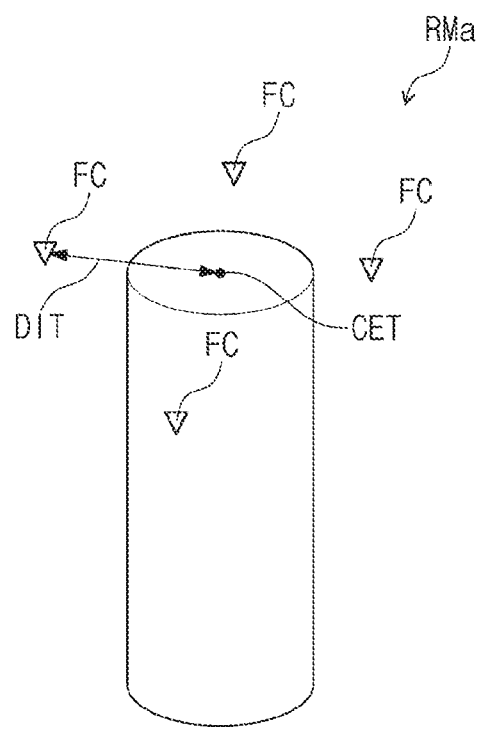
FIG. 9 is a perspective view illustrating one rod part according to an exemplary embodiment of the inventive concept.

FIG. 9 is a perspective view illustrating one rod part RMa according to an exemplary embodiment of the inventive concept.

Referring to FIG. 9, a plurality of points of impact FC that are generated at the same distance DIT from a center CET of the rod part RMa are exemplarily illustrated. When the rod part RMa has a polygonal shape in a cross-section, although multiple points of impact are generated at the same distance as each other, forces applied to the rod part RMa may be different from each other according to a positional relationship between the rod part RMa and a vertex. However, when the rod part RMa has a cylindrical shape, the multiple points of impact FC may apply substantially the same amount of force to the rod part RMa.

Figure 10:
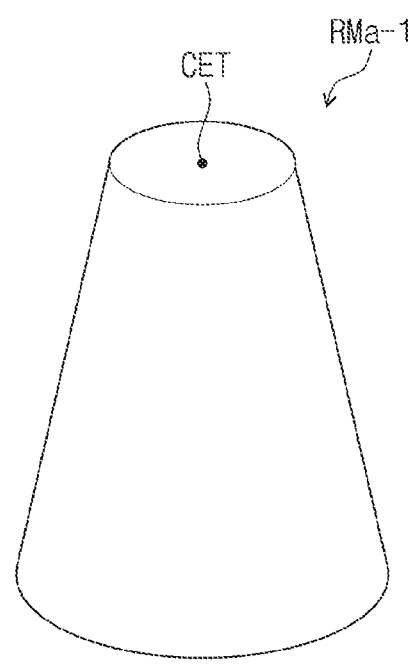
FIG. 10 is a perspective view illustrating one rod part according to an exemplary embodiment of the inventive concept.

FIG. 10 is a perspective view illustrating one rod part RMa-1 according to an exemplary embodiment of the inventive concept.

Referring to FIG. 10, the rod part RMa-1 may have a truncated cone shape. The rod part RMa-1 may have a circular shape on a plane. Accordingly, as described with reference to FIG. 9, multiple points of impact FC (refer to FIG. 9) generated at the same distance DIT (refer to FIG. 9) from a center CET of the rod part RMa-1 may apply substantially the same amount of force to the rod part RMa-1.

The shape of the rod part RMa-1 may be modified according to exemplary embodiments. For example, the rod part RMa-1 may have a truncated polygonal shape. For example, the rod part RMa-1 may have a polygonal shape such as a triangle, a rectangle, a pentagon, a hexagon, an octagon, etc. on a plane.

Figure 11:
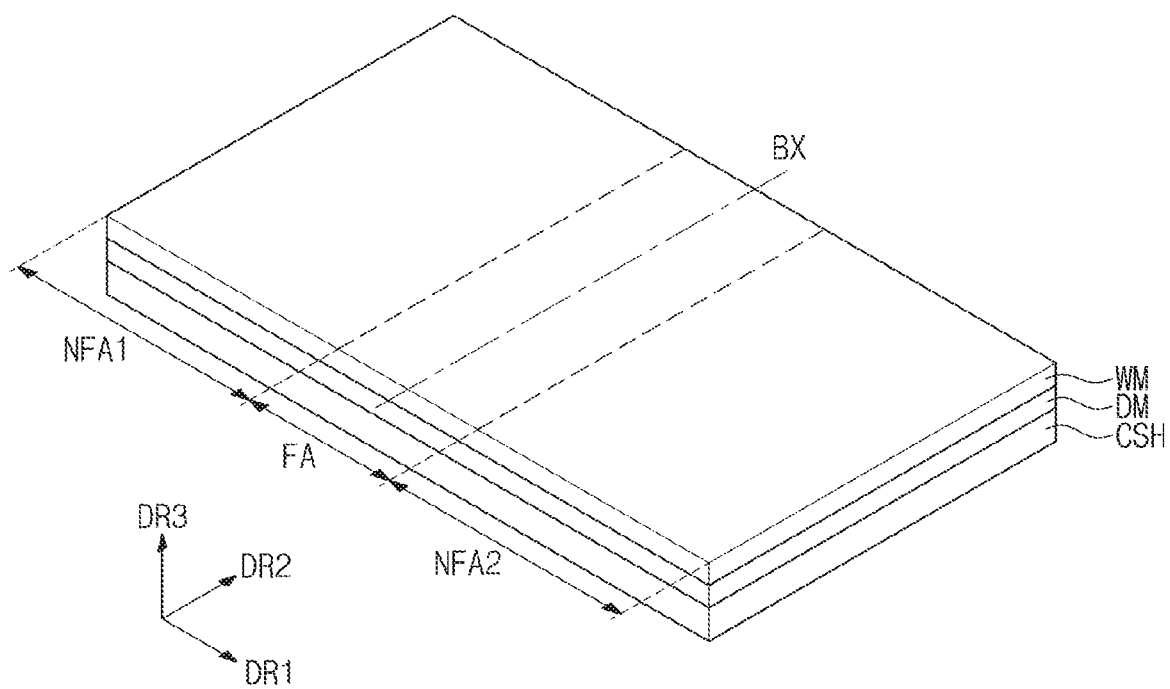
FIG. 11 is a perspective view illustrating a display device according to an exemplary embodiment of the inventive concept.

FIG. 11 is a perspective view illustrating the display device DD according to an exemplary embodiment of the inventive concept.

Referring to FIG. 11, for convenience of illustration, only the window WM, the display panel DM, and the cushion layer CSH of the display device DD are illustrated.

The display device DD in FIG. 11 may be the display device DD capable of folding. For example, the display device DD may include a folding portion FA, a first non-folding portion NFA1, and a second non-folding portion NFA2. According to exemplary embodiments, the folding portion FA is a portion of the display device DD that is capable of being folded, and the first and second non-folding portions NFA1 and NFA2 are portions of the display device DD that are not capable of being folded. Each of the window WM, the display panel DM, and the cushion layer CSH, which constitute the display device DD, may include the folding portion FA, the first non-folding portion NFA1, and the second non-folding portion NFA2.

The folding portion FA may be a folding area with respect to the bending axis BX, and each of the first non-folding portion NFA1 and the second non-folding portion NFA2 may be a non-folding area disposed adjacent to the folding area FA.

Figure 12:
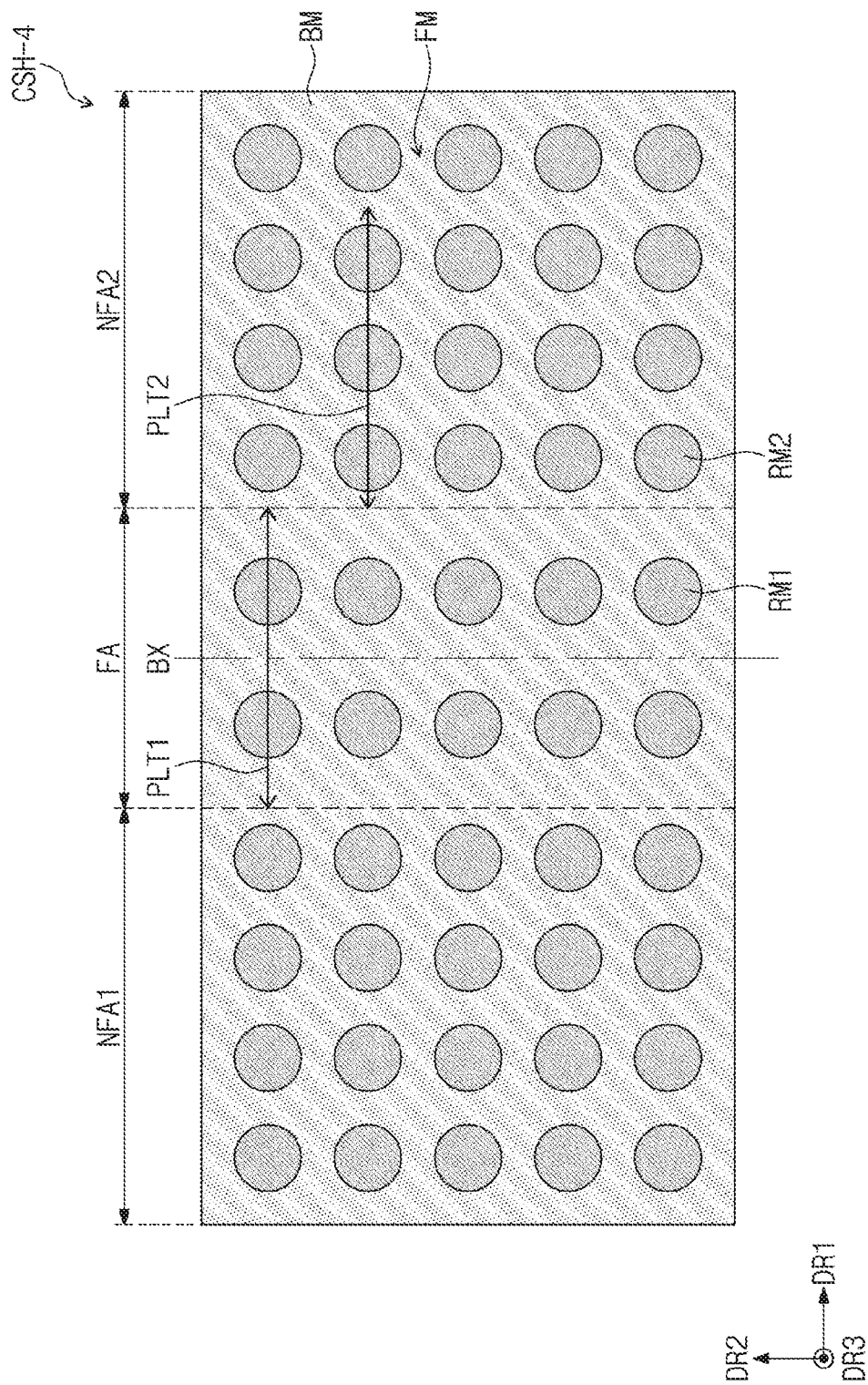
FIG. 12 is a plan view illustrating a cushion layer according to an exemplary embodiment of the inventive concept.

FIG. 12 is a plan view illustrating a cushion layer CSH-4 according to an exemplary embodiment of the inventive concept.

Referring to FIG. 12, the cushion layer CSH-4 may include first rod parts RM1, second rod parts RM2, a binder part BM, and a filling part FM.

The first rod parts RM1 may overlap the folding portion FA, and the second rod part RM2 may overlap the first non-folding portion NFA1 and the second non-folding portion NFA2. For example, the first rod parts RM1 may be disposed on the folding portion FA, and the second rod parts RM2 may be disposed on the first non-folding portion NFA1 and the second non-folding portion NFA2.

When compared with the cushion layer CSH illustrated in FIG. 4B, the cushion layer CSH-4 illustrated in FIG. 12 is different with regards to the density of the first rod parts RM1, in which the density refers to the number of rod parts per unit area. For example, the density of the first rod parts RM1 may be different from the density of the second rod parts RM2.

For example, the number of the first rod parts RM1 disposed in a first length range PLT1 in the folding portion FA may be different from the number of the second rod parts RM2 disposed in a second length range PLT2 in the first non-folding portion NFA1 and the second non-folding portion NFA2. The first length range PLT1 and the second length range PLT2 may have the same length. Each of the first length range PLT1 and the second length range PLT2 may be a length in the first direction DR1, and the first direction DR1 may cross the bending axis BX. The number of the first rod parts RM1 disposed in the first length range PLT1 may be less than the number of the second rod parts RM2 disposed in the second length range PLT2. For example, within the same length range, the number of the first rod parts RM1 disposed on the folding portion FA is less than the number of the second rod parts RM2 disposed on the first non-folding portion NFA1.

The density of the first rod parts RM1 disposed on the folding portion FA may be less than the density of the second rod parts RM2 disposed on the first and second non-folding portions NFA1 and NFA2. Each of the first rod parts RM1 and the second rod parts RM2 may have an elastic modulus greater than the elastic modulus of the filling part FM. Since the density of the first rod parts RM1 disposed on the folding portion FA decreases compared to the first and second non-folding portions NFA1 and NFA2, the flexible property of the display device DD (refer to FIG. 3A) may be improved.

Figure 13:
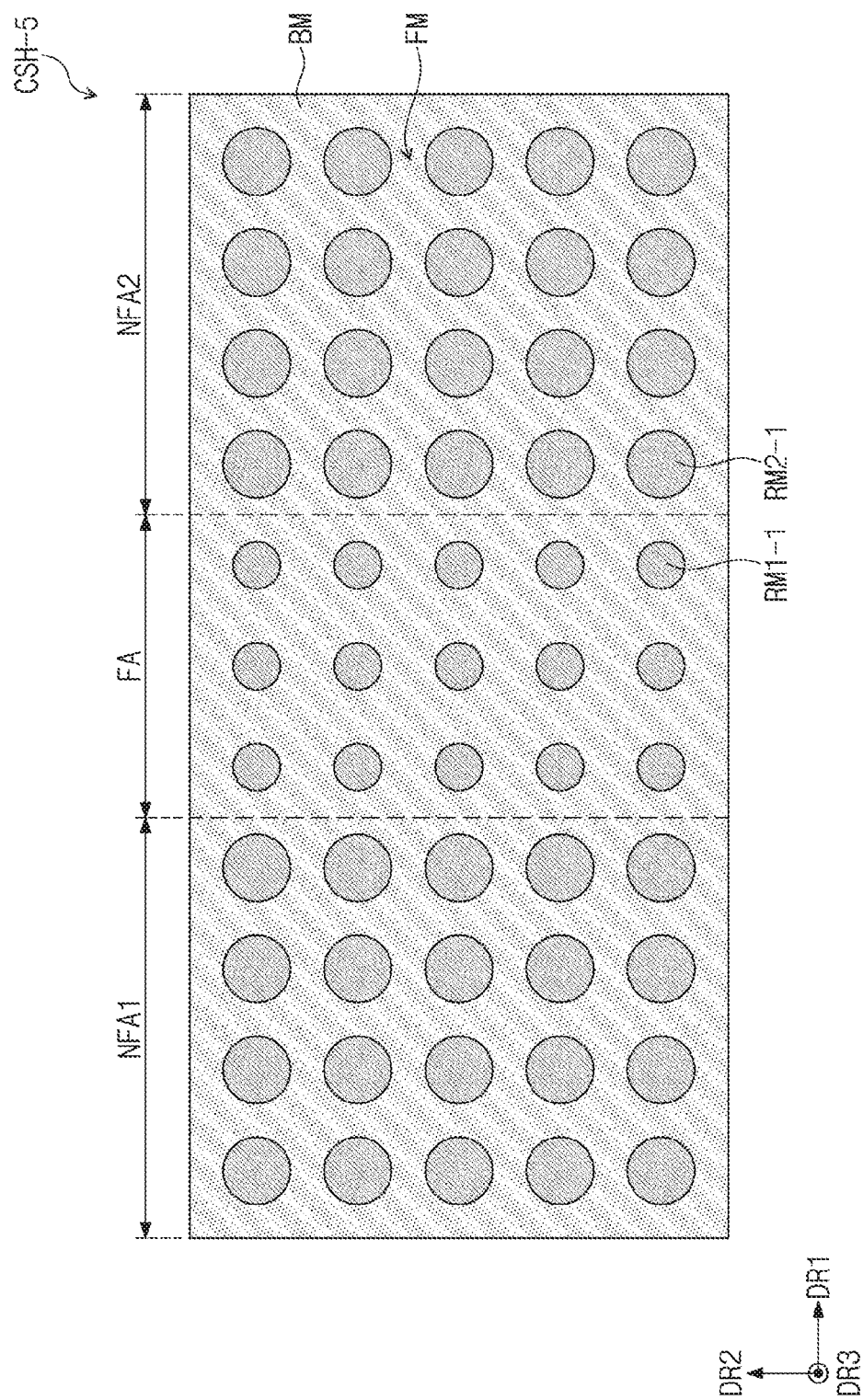
FIG. 13 is a plan view illustrating a cushion layer according to an exemplary embodiment of the inventive concept.

FIG. 13 is a plan view illustrating a cushion layer CSH-5 according to an exemplary embodiment of the inventive concept.

Referring to FIG. 13, the cushion layer CSH-5 may include first rod parts RM1-1, second rod parts RM2-1, a binder part BM, and a filling part FM.

The first rod parts RM1-1 may overlap the folding portion FA, and the second rod parts RM2-1 may overlap the first non-folding portion NFA1 and the second non-folding portion NFA2. For example, the first rod parts RM1-1 may be disposed on the folding portion FA, and the second rod part RM2-1 may be disposed on the first non-folding portion NFA1 and the second non-folding portion NFA2.

When compared with the cushion layer CSH illustrated in FIG. 4B, the cushion layer CSH-5 illustrated in FIG. 13 is different in regards to the size of the first rod parts RM1-1. For example, referring to FIG. 13, the size of the first rod parts RM1 disposed on the folding portion FA may be less than the size of the second rod parts RM2 disposed on the first and second non-folding portions NFA1 and NFA2. Here, the size may represent an area on a plane. In an exemplary embodiment, the first rod parts RM1-1 may be the same size as each other, the second rod parts RM2-1 may be the same size as each other, and the size of the first rod parts RM1-1 may be smaller than the size of the second rod parts RM2-1. The filling part FM is disposed in a region between the first rod parts RM1-1. The filling part FM has a flexible property greater than the flexible property of each of the first rod parts RM1-1. Accordingly, since the size of the first rod parts RM1-1 disposed on the folding portion FA decreases, the flexible property of the display device DD (refer to FIG. 3A) may be improved.

FIG. 13 exemplarily illustrates a state in which the number density of the first rod parts RM1-1 is the same as the number density of the second rod parts RM2-1. However, exemplary embodiments of the inventive concept are not limited thereto. For example, the density of the first rod parts RM1-1 may be adjusted to be less than the density of the second rod parts RM2-1 in an exemplary embodiment.

Figure 14:
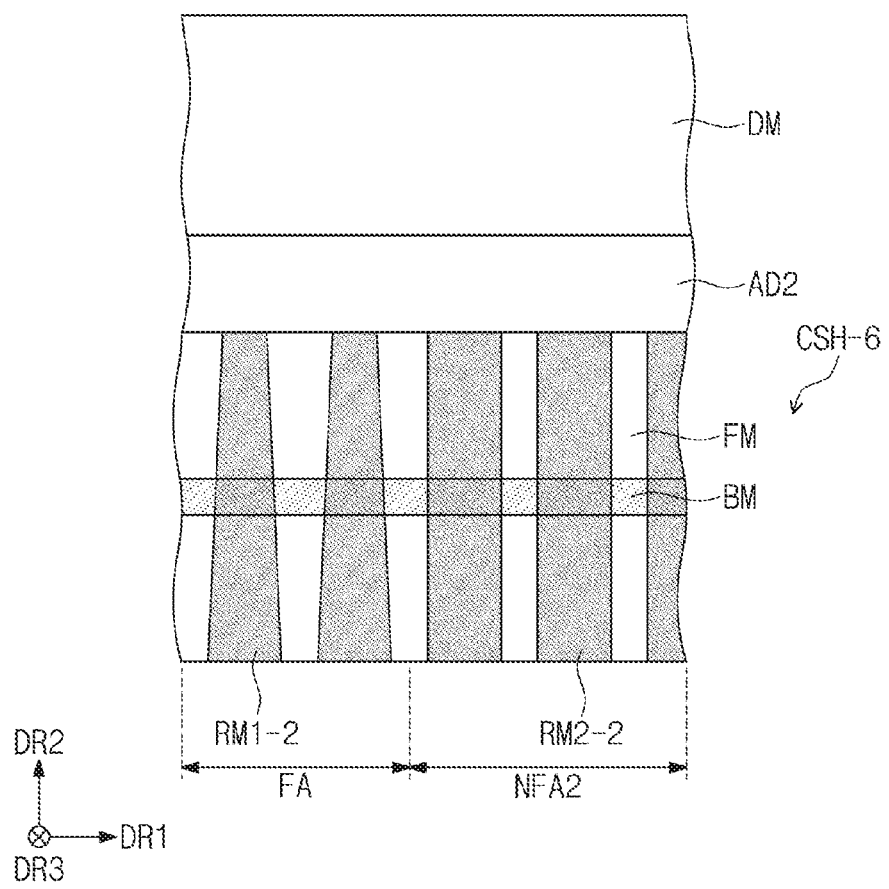
FIG. 14 is a cross-sectional view illustrating a cushion layer according to an exemplary embodiment of the inventive concept.

FIG. 14 is a cross-sectional view illustrating a cushion layer CSH-6 according to an exemplary embodiment of the inventive concept.

Referring to FIG. 14, the cushion layer CSH-6 may include first rod parts RM1-2, second rod parts RM2-2, a binder part BM, and a filling part FM.

The first rod parts RM1-2 may overlap the folding portion FA, and the second rod parts RM2-2 may overlap the first non-folding portion NFA1 (refer to FIG. 11) and the second non-folding portion NFA2. For example, the first rod parts RM1-2 may be disposed on the folding portion FA, and the second rod parts RM2-2 may be disposed on the first non-folding portion NFA1 and the second non-folding portion NFA2.

The first rod parts RM1-2 and the second rod parts RM2-2 may be different from each other in shape. For example, each of the first rod parts RM1-2 may have, for example, a truncated pyramid shape (e.g., a truncated cone shape), and each of the rod parts RM2-2 may have, for example, a cylindrical shape.

Figure 15:
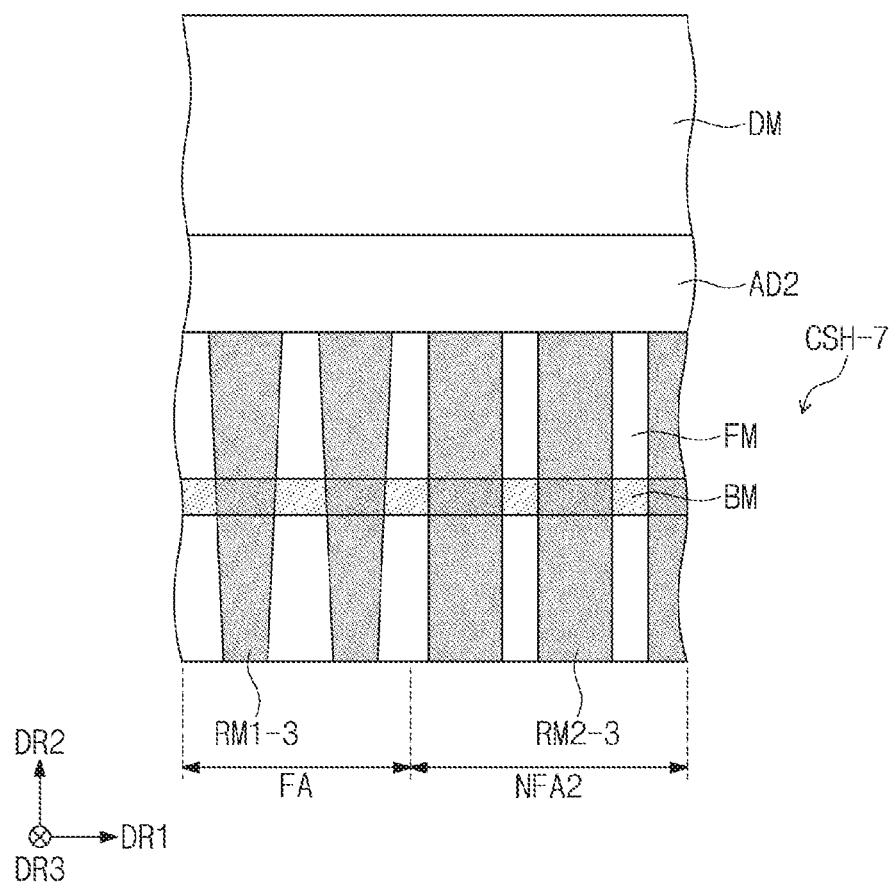
FIG. 15 is a cross-sectional view illustrating a cushion layer according to an exemplary embodiment of the inventive concept.

FIG. 15 is a cross-sectional view illustrating a cushion layer CSH-7 according to an exemplary embodiment of the inventive concept.

Referring to FIG. 15, the cushion layer CSH-7 may include first rod parts RM1-3, second rod parts RM2-3, a binder part BM, and a filling part FM.

The first rod parts RM1-3 may overlap the folding portion FA, and the second rod parts RM2-3 may overlap the first non-folding portion NFA1 (refer to FIG. 11) and the second non-folding portion NFA2. For example, the first rod parts RM1-3 may be disposed on the folding portion FA, and the second rod parts RM2-3 may be disposed on the first non-folding portion NFA1 and the second non-folding portion NFA2.

The first rod parts RM1-3 and the second rod parts RM2-3 may be different from each other in shape. For example, each of the first rod parts RM1-3 may have, for example, a truncated pyramid shape (e.g., a truncated cone shape), and each of the second rod parts RM2-3 may have, for example, a cylindrical shape.

According to exemplary embodiments of the inventive concept, a cushion layer of a display device includes a plurality of rod parts, a binder part coupled to the plurality of rod parts, and a filling part, as described above. The plurality of rod parts may prevent the display panel of the display device from being damaged by an external impact, or may reduce the amount of damage caused to the display panel by an external impact. The binder part may prevent the plurality of rod parts from being deviated from a specific position, thus, improving the impact absorption performance of the cushion layer. The filling part may have a flexible property such that the shape thereof is deformable in correspondence to the shape deformation of the display device. Thus, both the impact property and the flexible property of the display device may be improved.

While the inventive concept has been particularly shown and described with reference to the exemplary embodiments thereof, it will be understood by those of ordinary skill in the art that various changes in form and detail may be made therein without departing from the spirit and scope of the inventive concept as defined by the following claims.

What is claimed is:

1. A display device, comprising:
a window;
a display panel disposed below the window; and
a cushion layer disposed below the display panel,
wherein the cushion layer comprises:
a first binder;
a second binder spaced apart from the first binder in a thickness direction of the cushion layer; and
a plurality of rods extending in the thickness direction of the cushion layer,
wherein each of the plurality of rods extends through both the first binder and the second binder.

2. The display device of claim 1, wherein the cushion layer further comprises a filler disposed in a space between the plurality of rods and the first and second binders.

3. The display device of claim 2, wherein each of the plurality of rods has a first elastic modulus, the filler has a second elastic modulus, and the first elastic modulus is greater than the second elastic modulus.

4. The display device of claim 1, wherein each of the plurality of rods has a cylindrical shape extending in the thickness direction.

5. The display device of claim 1, wherein the plurality of rods and the first and second binders comprise the same material as each other.

6. The display device of claim 1, wherein the display panel comprises a folding portion configured to be folded, and a non-folding portion disposed adjacent to the folding portion and configured not to be folded, and
the plurality of rods comprises first rods and second rods, the first rods overlap the folding portion on a plane, and the second rods overlap the non-folding portion on the plane.

7. The display device of claim 6, wherein a density of the first rods is less than a density of the second rods.

8. The display device of claim 6, wherein a size of each of the first rods is less than a size of each of the second rods on the plane.

9. The display device of claim 8, wherein a density of the first rods is the same as a density of the second rods on the plane.

10. The display device of claim 1, wherein each of the plurality of rods has an elastic modulus of about 1 GPa or more and about 3 GPa or less.

11. The display device of claim 1, wherein each of the plurality of rods comprises polyether ether keton (PEEK), polyethylene terephthalate (PET), or polyamide (PA).

12. A display device comprising:
a window;
a display panel disposed below the window; and
a cushion layer disposed below the display panel,
wherein the cushion layer comprises:
a binder; and
a plurality of rods extending in a thickness direction of the cushion layer,
wherein a point overlapping each of the plurality of rods and the binder when viewed on a cross section is disposed between a central portion of each of the plurality of rods in the thickness direction and the display panel,
wherein, when the window, the display panel, and the cushion layer are in a folded state, the window is disposed between a first portion of the display panel and a second portion of the display panel, and wherein the first portion of the display panel and the second portion of the display panel face each other in the folded state.

13. A display device, comprising:
a window;
a display panel disposed below the window; and
a cushion layer disposed below the display panel,
wherein the cushion layer comprises:
   a binder; and
   a plurality of rods extending in a thickness direction of the cushion layer,
wherein a point overlapping each of the plurality of rods and the binder when viewed on a cross section is disposed at a point farther from the display panel than a central portion of each of the plurality of rods in the thickness direction, and the central portion is disposed between the point and the display panel,
wherein, when the window, the display panel, and the cushion layer are in a folded state, the display panel is disposed between a first portion of the window and a second portion of the window, and
wherein the first portion of the window and the second portion of the window are opposite each other in the folded state.

14. A display device, comprising:
a foldable display panel; and
a cushion layer disposed below the foldable display panel,
wherein the cushion layer comprises:
   a plurality of rods, each having a first elastic modulus and each extending in a third direction which is a thickness direction of the cushion layer; and
   a filler having a second elastic modulus less than the first elastic modulus, and disposed in a space extending in a first direction of the cushion layer between the plurality of rods and a second direction of the cushion layer between the plurality of rods,
wherein the second direction crosses the first direction,
wherein the foldable display panel comprises a folding portion configured to be folded, and a non-folding portion disposed adjacent to the folding portion and configured not to be folded,
wherein the plurality of rods comprises first rods and second rods, the first rods overlap the folding portion on a plane, and the second rods overlap the non-folding portion on the plane, and
wherein a size of each of the first rods is less than a size of each of the second rods on the plane.

15. The display device of claim 14, wherein the cushion layer further comprises a first binder coupled to the plurality of rods, and a second binder spaced apart from the first binder in the thickness direction and coupled to the plurality of rods.

16. The display device of claim 14, wherein the number of first rods disposed in a first area among the first rods and the number of second rods disposed in a second area equal to the first area among the second rods are the same.

* * * * *